US007787422B2

(12) United States Patent
Jang et al.

(10) Patent No.: US 7,787,422 B2
(45) Date of Patent: Aug. 31, 2010

(54) FAST HANDOVER METHOD FOR IPV6 OVER 802.16 NETWORK

(75) Inventors: Hee-Jin Jang, Yongin-si (KR); Youn-Hee Han, Guri-si (KR); Mi-Sun Do, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1029 days.

(21) Appl. No.: 11/480,508

(22) Filed: Jul. 5, 2006

(65) Prior Publication Data

US 2007/0008930 A1  Jan. 11, 2007

Related U.S. Application Data

(60) Provisional application No. 60/695,875, filed on Jul. 5, 2005.

(30) Foreign Application Priority Data

Jan. 27, 2006  (KR) ..................... 10-2006-0009040
Jul. 4, 2006  (KR) ..................... 10-2006-0062486

(51) Int. Cl.
*H04W 4/00*  (2009.01)

(52) U.S. Cl. .................. 370/331; 455/436; 455/437; 455/438; 455/439; 455/442; 370/328; 370/329; 370/330; 370/332; 370/338; 709/226; 709/227; 709/228; 709/229; 709/230

(58) Field of Classification Search .................. 370/328, 370/329, 330, 331, 332, 333, 338, 351, 352, 370/390, 395.52; 455/436–444; 709/220, 709/223–230

See application file for complete search history.

(56) References Cited

U.S. PATENT DOCUMENTS

| 6,930,988 | B2 * | 8/2005 | Koodli et al. ............... 370/331 |
| 7,035,640 | B2 * | 4/2006 | Narayanan et al. .......... 455/436 |
| 7,245,917 | B2 * | 7/2007 | Chiueh ....................... 455/442 |
| 7,333,454 | B2 * | 2/2008 | Yang et al. .................. 370/331 |
| 7,353,027 | B2 * | 4/2008 | Karagiannis et al. ........ 455/436 |
| 7,508,793 | B2 * | 3/2009 | Haddad et al. .............. 370/331 |
| 7,522,558 | B2 * | 4/2009 | Ikeda .......................... 370/331 |
| 7,548,525 | B2 * | 6/2009 | Suh et al. .................... 370/331 |
| 2003/0225892 | A1 * | 12/2003 | Takusagawa et al. ....... 709/227 |
| 2004/0137902 | A1 * | 7/2004 | Chaskar et al. ............. 455/436 |
| 2004/0264476 | A1 * | 12/2004 | Alarcon et al. ......... 370/395.52 |
| 2005/0047372 | A1 * | 3/2005 | Yano et al. .................. 370/331 |
| 2006/0029020 | A1 * | 2/2006 | Jung et al. ................... 370/331 |
| 2006/0128385 | A1 * | 6/2006 | Lee et al. .................... 455/436 |
| 2006/0285519 | A1 * | 12/2006 | Narayanan et al. .......... 370/331 |

* cited by examiner

*Primary Examiner*—Charles N Appiah
*Assistant Examiner*—Olumide T Ajibade Akonai
(74) *Attorney, Agent, or Firm*—NSIP Law

(57) ABSTRACT

A handover method of a mobile station (MS) in a mobile communication system having MSs and radio access stations (RASs), each of which includes an IEEE 802.16 standard-based medium access control (MAC) layer and an Internet protocol version 6 (IPv6)-based IP layer. The handover method includes the step of gathering IP network information of a neighbor RAS through a message exchange with a previous RAS. A target RAS for handover based on the gathered IP network information of the neighbor RAS is determined, after the target RAS is determined, the previous RAS tunnels data for targeting the MS to the target RAS, Then the tunneled data are received from the target RAS.

12 Claims, 17 Drawing Sheets

FAST HANDOVER METHOD FOR IPV6 OVER 802.16 NETWORK

CROSS-REFERENCE TO RELATED PATENT APPLICATION

This application claims the benefit under 35 U.S.C. §119 (e) of an application entitled "Fast Handover Method for IPv6 over IEEE 802.16 Networks" filed in the United States Patent and Trademark Office on Jul. 5, 2005 and assigned Ser. No. 60/695,875, and under 35 U.S.C. §119(a) of applications entitled "Fast Handover Method for IPv6 over IEEE 802.16 Networks" filed in the Korean Intellectual Property Office on Jan. 27, 2006, and Jul. 4, 2006 and assigned Serial Nos. 2006-9040 and 2006-62486, respectively, the entire contents of both of which are hereby incorporated by reference.

BACKGROUND OF THE INVENTION

1. Field of the Invention

The present invention relates generally to IPv6 over IEEE 802.16 networks. In particular, the present invention relates to a fast handover method for IPv6 over IEEE 802.16 networks.

2. Description of the Related Art

The recent generalization of the use of mobile stations such as a notebook computer and a Personal Digital Assistant (PDA) increases the need for high-speed wireless Internet service, and with the integration of wireless networks and the Internet, users expect the network environment in which they can freely use the Internet anytime anyplace. Accordingly, a Wireless Broadband Internet (WiBro) standard, which is a wireless Internet standard in which high-speed Internet access is possible not only in the stationary state but also in the moving state, has recently been established by Korean Telecommunications Technology Association (TTA). The WiBro standard supports mobility of 60 Km/h or below, overcoming the limitation of the existing wired system, and is so designed as to seamlessly provide high-speed wireless Internet service indoors and/or outdoors.

A mobility support method currently available in the WiBro standard is described as a Medium Access Control (MAC) protocol performed between a mobile station (MS) and a Radio Access Station (RAS) when the MS moves between RASs. However, if an MS moves to a new Access Control Router (ACR) of another subnet, it should accept an IP Mobility Support Protocol to maintain the current session in communication. Mobile Internet Protocol version 6 (MIPv6) technology established by MIP6 Working Group of Internet Engineering Task Force (IETF) is a typical international standard protocol for the IP Mobility Support. In particular, if the improved future WiBro service environment accepts IPv6 which is the next generation Internet protocol, the MIPv6 will gain in importance as Mobility Support Protocol.

The MIPv6 technology supports mobility by binding a Home Address (HoA) of an MS with a new Care-or-Address (CoA) generated by a network to which the MS moved, for a Home Agent (HA), using the dual addressing system. In particular, the MIPv6 technology can support an optimized routing path for data packets by sending the binding message even to a Correspondent Node (CN). However, MIPv6, which is a protocol simply related to location registration of an MS and route reestablishment for data packets of the current session in communication, has several problems in supporting the mobility enough to satisfy real-time communication, like Voice over IP (VoIP).

MIPv6 Signaling and Handoff Optimization (MIPSHOP) Working Group of IETF has established a Fast Mobile IPv6 (FMIPv6) protocol to make up for the defects of MIPv6 and support fast IPv6 handover. FMIPv6 is a protocol designed such that it supports a MAC Layer and detects the position to which an MS will newly move and previously exchanges information necessary for IPv6 handover and service resumption, thereby enabling fast service resumption when the movement actually occurs. FMIPv6 needs a definite mechanism for supporting events from the MAC layer and exchanging such events because it predicts mobility of an MS basically depending on the MAC layer. In addition, because the information available in the link layer differs according to link type and the timing at which the information is provided is also dependent on a protocol of the link layer, when FMIPv6 is applied to the actual network, the FMIPv6 should be redesigned such that interaction with the link layer is optimized, taking a characteristic of the corresponding link into account.

SUMMARY OF THE INVENTION

An aspect of exemplary embodiments of the present invention is to address at least the above problems and/or disadvantages and to provide at least the advantages described below. Accordingly, an object of an exemplary embodiment of the present invention is to provide a handover method for minimizing, by an IPv6 MS, a handover delay time during movement (or handover) between subnets in a WiBro network.

It is another object of an exemplary embodiment of the present invention to provide a fast handover method for providing seamless handover even for real-time traffics of an MS by defining an interworking mechanism between an FMIPv6 IP layer and a WiBro MAC layer, and available messages therefore.

According to an aspect of exemplary embodiments of the present invention, a handover method of a mobile station (MS) in a mobile communication system composed of MSs and radio access stations (RASs) is provided. Each of them includes an IEEE 802.16 standard-based medium access control (MAC) layer and an Internet protocol version 6 (IPv6)-based IP layer. The handover method comprises the steps of gathering IP network information of a neighbor RAS through a message exchange with a previous RAS, determining a target RAS for handover based on the gathered IP network information of the neighbor RAS, after the target RAS is determined, tunneling, by the previous RAS, data targeting the MS to the target RAS, and receiving the tunneled data from the target RAS.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of the present invention will become more apparent from the following detailed description when taken in conjunction with the accompanying drawings in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. In the following description, a detailed description of known functions and configurations incorporated herein has been omitted for clarity and conciseness.

An operation mode of FMIPv6, which is based on mobility prediction as described above, is divided into "Predictive Mode" and "Reactive Mode" depending on success/failure in the mobility prediction and handover preparation process.

Predictive Mode

Figure 1A:
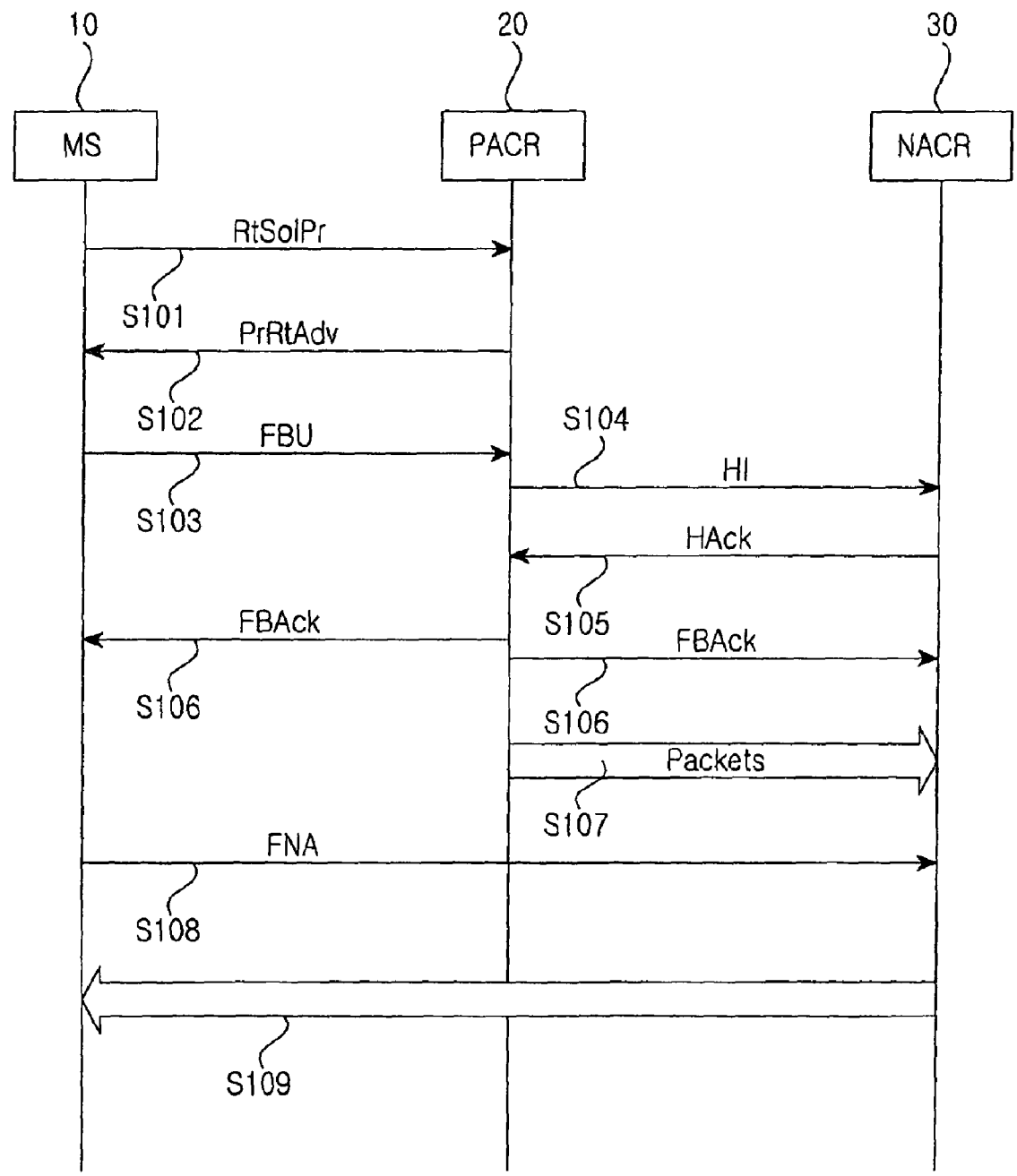
FIG. 1A a message flow diagram illustrating a predictive mode handover process in a conventional FMIPv6 system.

FIG. 1A a message flow diagram illustrating a predictive mode handover process in a conventional FMIPv6 system.

Referring to FIG. 1A, upon detecting a New Radio Access Station (NRAS), a mobile station (MS) 10 sends a Router Solicitation for Proxy (RtSolPr) message to a Previous ACR (PACR) 20 from which it is currently receiving a service in order to acquire information on a New ACR (NACR) 30 to which the NRAS (not shown) belongs in step S101. Upon receipt of the RtSolPr message, the PACR 20 detects IP address, MAC address and subnet prefix information of the NACR 30 based on a MAC address of a new neighbor RAS, extracted from the RtSolPr message, and sends a Proxy Router Advertisement (PrRtAdv) message including the detected information to the MS 10 in step S102.

In this manner, the MS 10 gathers information on neighbor RASs (not shown) and the NACR 30, and determines a target RAS (i.e. NRAS) to which it will perform handover based on the gathered information. Henceforth, a neighbor ACR to which the target RAS belongs becomes a target ACR (i.e. NACR). The MS 10 creates a New Care-of-Address (NCoA), or a new IP address, to be used after handover based on prefix information of the NACR 30, acquired through the PrRtAdv message, and sends a Fast Binding Update (FBU) message to the PACR 20 to bind a Previous Care-of-Address (PCoA) with the NCoA in step S103.

Upon successful receipt of a Fast Binding Acknowledgement (FBAck) message in response to the FBU message in step S106, the MS 10 operates in the predictive mode after handover.

Upon receipt of the FBU message from the MS 10, the PACR 20 sends a Handover Initiation (HI) message to the NACR 30 in step S104, and receives a Handover Acknowledge (HAck) message in response thereto in step S105. Then the PACR 20 verifies uniqueness of an NCoA to be used after the movement (or handover) using the HAck message, and sends an FBAck message with the NCoA to the MS 10 and the NACR 30 in step S106. In addition, the PACR 20 creates a PCoA-NCoA tunnel and tunnels all packets targeting the PCoA to the NCoA in step S107. Then the NACR 30 intercepts the packets targeting the NCoA and buffers the intercepted packets therein. Thereafter, upon receipt of a Fast Neighbor Advertisement (FNA) message from the MS 10 after completion its movement in step S108, the NACR 30 forwards all the buffered packets to the MS 10 in step S109, completing the handover procedure.

Reactive Mode

Figure 1B:
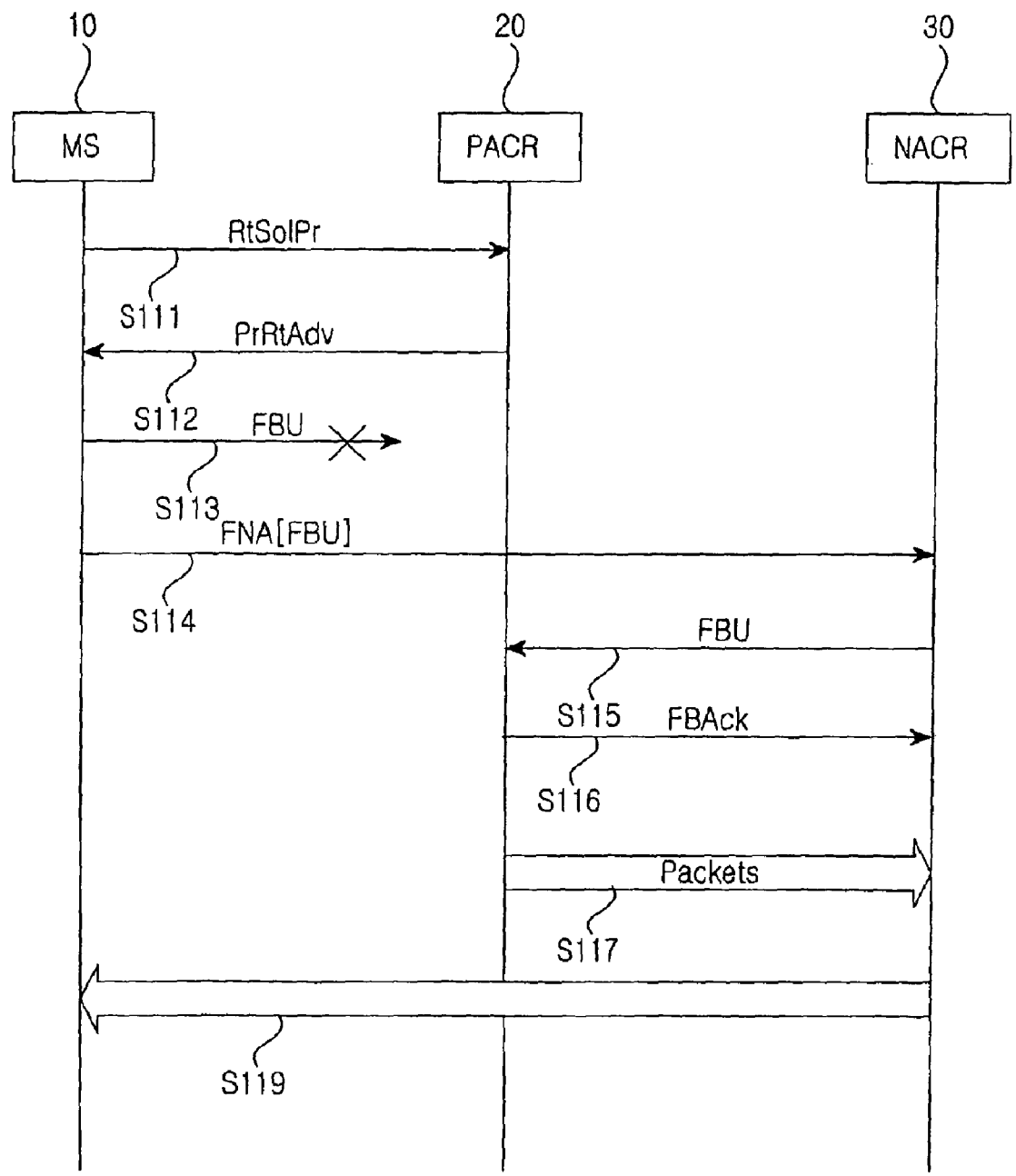
FIG. 1B is a message flow diagram illustrating a reactive mode handover process in a conventional FMIPv6 system.

FIG. 1B is a message flow diagram illustrating a reactive mode handover process in a conventional FMIPv6 system.

Referring to FIG. 1B, after steps S111 and S112 similar to the corresponding steps in FIG. 1A, an MS 10 operates in a reactive mode in step S113, if it fails to send an FBU message before handover, or if it starts handover before receipt of an FBAck message even though it sent the FBU message.

In this case, the MS 10, as it fails to receive the FBAck message, cannot determine whether the FBU message has normally arrived at a PACR 20. Therefore, the MS 10 encapsulates the FBU message in an FNA message and sends the FNA message to an NACR 30 in step S114. Upon receipt of the FBU message from the MS 10, the NACR 30 first determines whether an NCoA included therein is identical to the address used in the corresponding network. If the addresses are not identical to each other as a result of the uniqueness check, the NACR 30 sends the FBU message included in the FNA message to the PACR 20 in step S115. Upon arrival of an FBAck message, the NACR 30 generates a PCoA-NCoA tunnel and finally forwards the tunneled packets to the MS 10 in step S117. In this case, the FBAck message, because its destination is the NCoA, is forwarded to the MS 10 together with the tunneled packets. If the NCoA is already in use, the NACR 30 sends a PrRtAdv message including a negative acknowledgement (NACK) message to the MS 10 and discards the FBU message in step S119.

Figure 2:
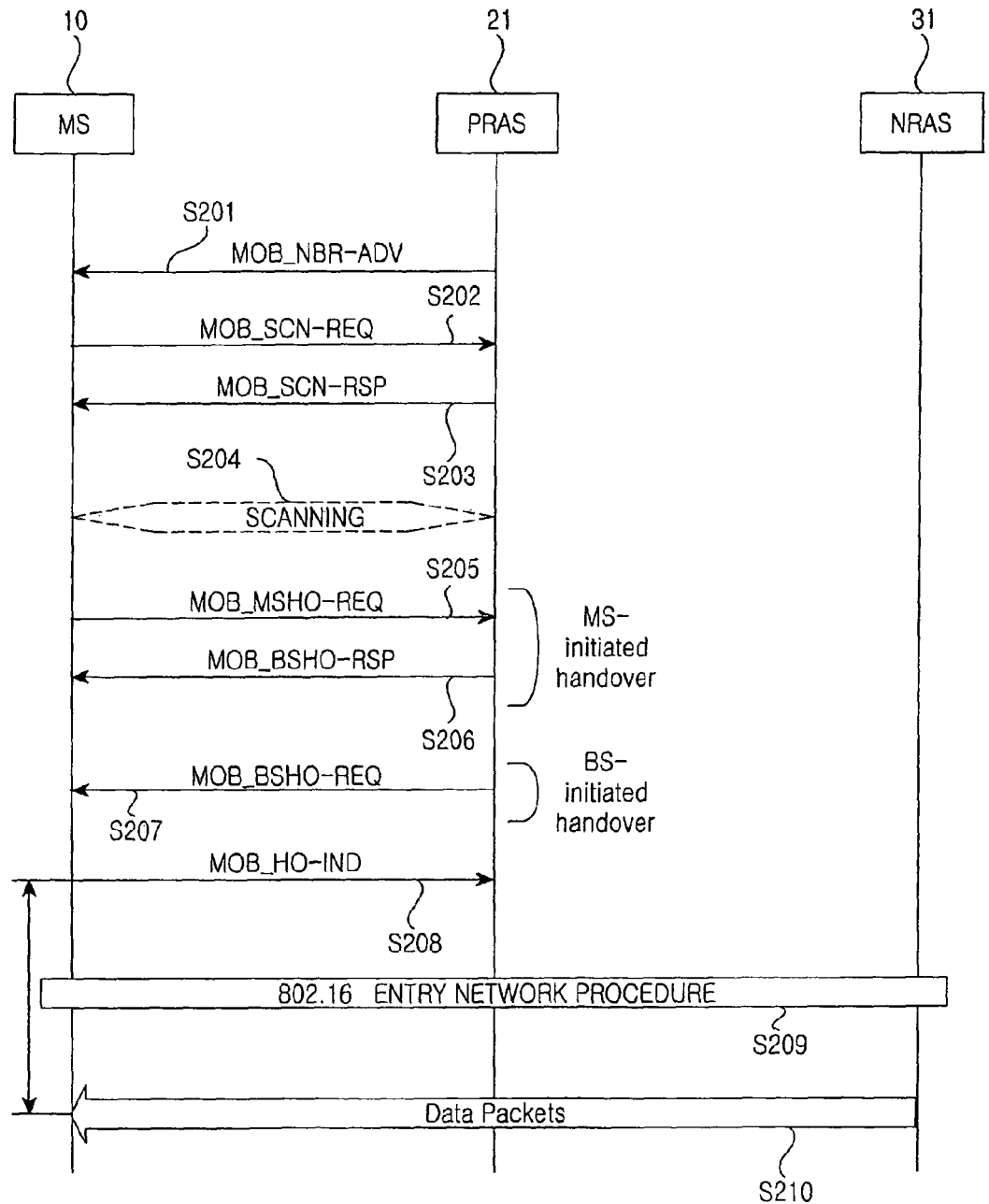
FIG. 2 is a message flow diagram illustrating a link layer handover procedure in a conventional WiBro network.

FIG. 2 is a message flow diagram illustrating a link layer handover procedure in a conventional WiBro network.

Referring to FIG. 2, the handover in the WiBro network conceptually comprises a neighbor network search/information acquisition phase, a handover preparation phase, and a handover execution phase.

(1) Neighbor Network Search/Information Acquisition Phase

Compared with the network entry/handover procedure in the wireless Local Area Network (LAN), the handover procedure in the WiBro network is composed of more complex processes to support accurate adjustment of parameters and flexibility in the procedure. A WiBro MS 10 receives a Neighbor Advertisement (MOB_NBR-ADV) message that is periodically advertised from its RAS in a corresponding network in step S201. The MOB_NBR-ADV message comprises network attributes for a PRAS 21 and neighbor RASs. Therefore, upon receipt of this message, the MS 10 can acquire identifier (ID), quality-of-service (QoS) parameter, and channel information of the neighbor RASs, and later use the acquired information to perform faster handover.

There is another network information acquisition method that uses a scanning procedure performed by the MS 10. This method refers to the procedures S202, S203 and S204 for measuring signal qualities of downlinks received from the neighbor RASs. The MS 10 can acquire an ID list of the neighbor RASs through the MOB_NBR-ADV message, select an appropriate RAS based on real-time link information acquired through the scanning, and manage a list of candidate RASs for handover.

To reduce a handover delay time, the MS 10 can perform an association process including ranging with the neighbor RASs in the scanning process. The ranging refers to the procedure that the MS 10 first performs in the course of entering a new network. Through this process, the MS 10 acquires the basic information related to physical characteristic, timing and power control of the channel, including the frequency used in an NRAS 31, thereby accelerating the handover procedure.

(2) Handover Preparation Phase

The MS 10 determines an optimal NRAS 31 by comparing the already acquired signal strengths and QoS parameters of neighbor RASs. The MS 10 compares QoS and signal strength provided from a PRAS 21 with associated thresholds to create a list of RASs for handover, and sends an MS Handover Request (MOB_MSHO-REQ) message with the RAS list to the PRAS 21 in step S205. In response thereto, the PRAS 21 comprises a candidate RAS list acquired depending on the RAS list in a BS Handover Response (MOB_BSHO-RSP) message, and sends the MOB_BSHO-RSP message to the MS 10 in step S206. In this case, the PRAS 21 can previously send session and configuration information of the MS 10 by notifying the handover to the candidate RASs via a backbone network, thereby reducing the future handover time. In this phase, the PRAS 21 can first send a BS Handover Request (MOB_BSHO-REQ) message to the MS 10 in step S207, thereby initiating the handover process.

(3) Handover Execution Phase

If the MS 10 determines a target RAS and is ready to move thereto, the MS 10 can no longer exchange packets via the PRAS 21 from the time at which it sends a Handover Indication (MOB_HO-IND) message to the PRAS 21 in step S208. After its movement, the MS 10 performs a network entry process in step S209. The MS 10 first performs ranging to acquire link synchronization with the NRAS 31. After successfully completing the ranging, the MS 10 enters capability negotiation with the NRAS 31. Thereafter, the MS 10 finally registers itself in the NRAS 31 through an authentication process. If the NRAS 31 has previously received the capability and authentication information of the MS 10 via the backbone network, the MS 10 can omit the corresponding process, reducing the handover process. If the network entry process is successfully completed after completion of the registration process, the NRAS 31 can start a service to the MS 10 from that time on in step S210.

If the MS 10 moves to another subnet in the network, it should reacquire a valid NCoA and additionally follow an IP access reestablishment process using the valid NCoA. In addition, to resume the session performed in the previous network using the NCoA, the MS 10 should separately perform an IP handover procedure, like MIPv6.

Figure 3A:
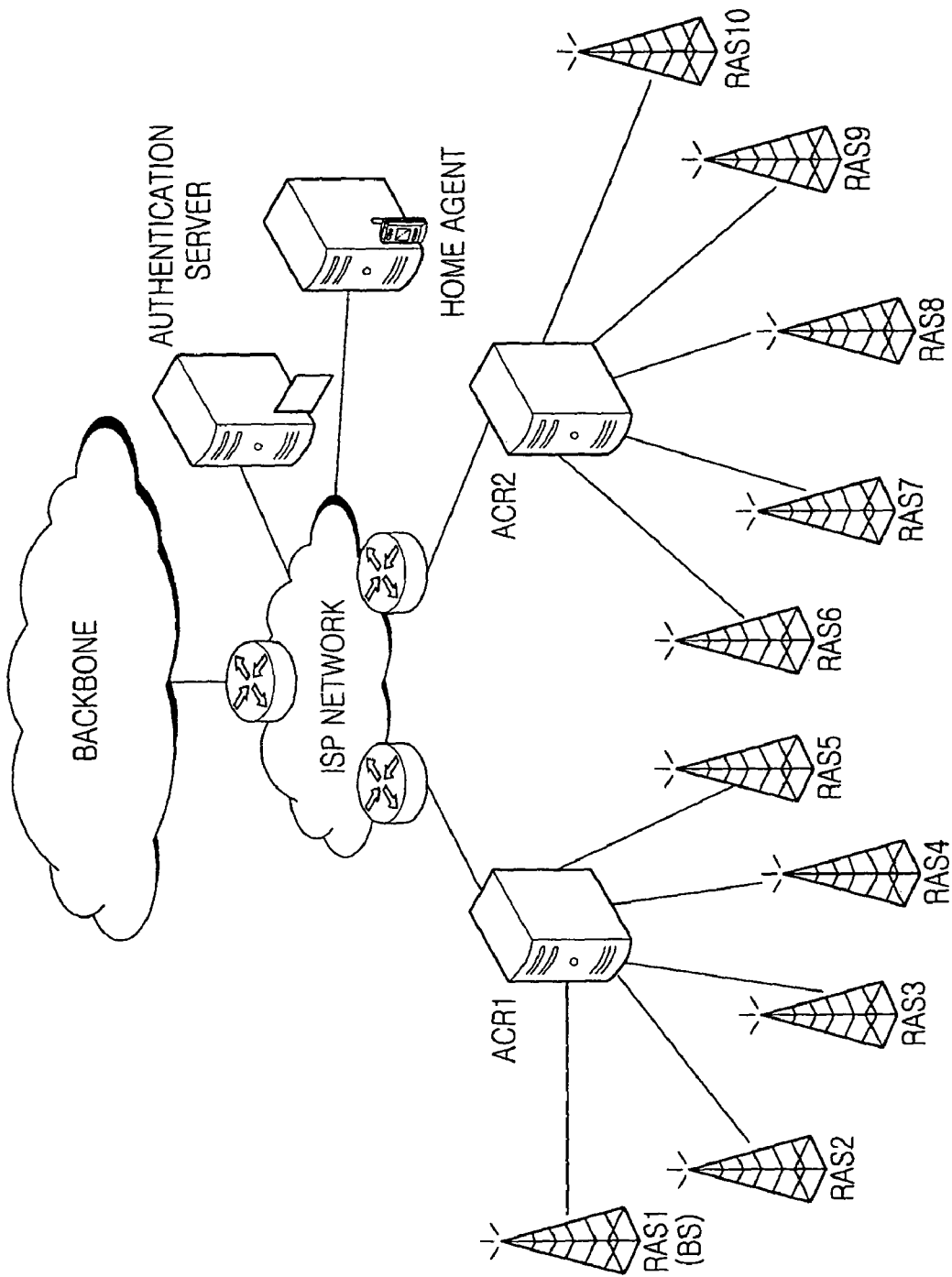
FIGS. 3A and 3B are diagrams illustrating possible configurations of a WiBro network equipped with FMIPv6 according to an exemplary embodiment of the present invention.
Figure 3B:
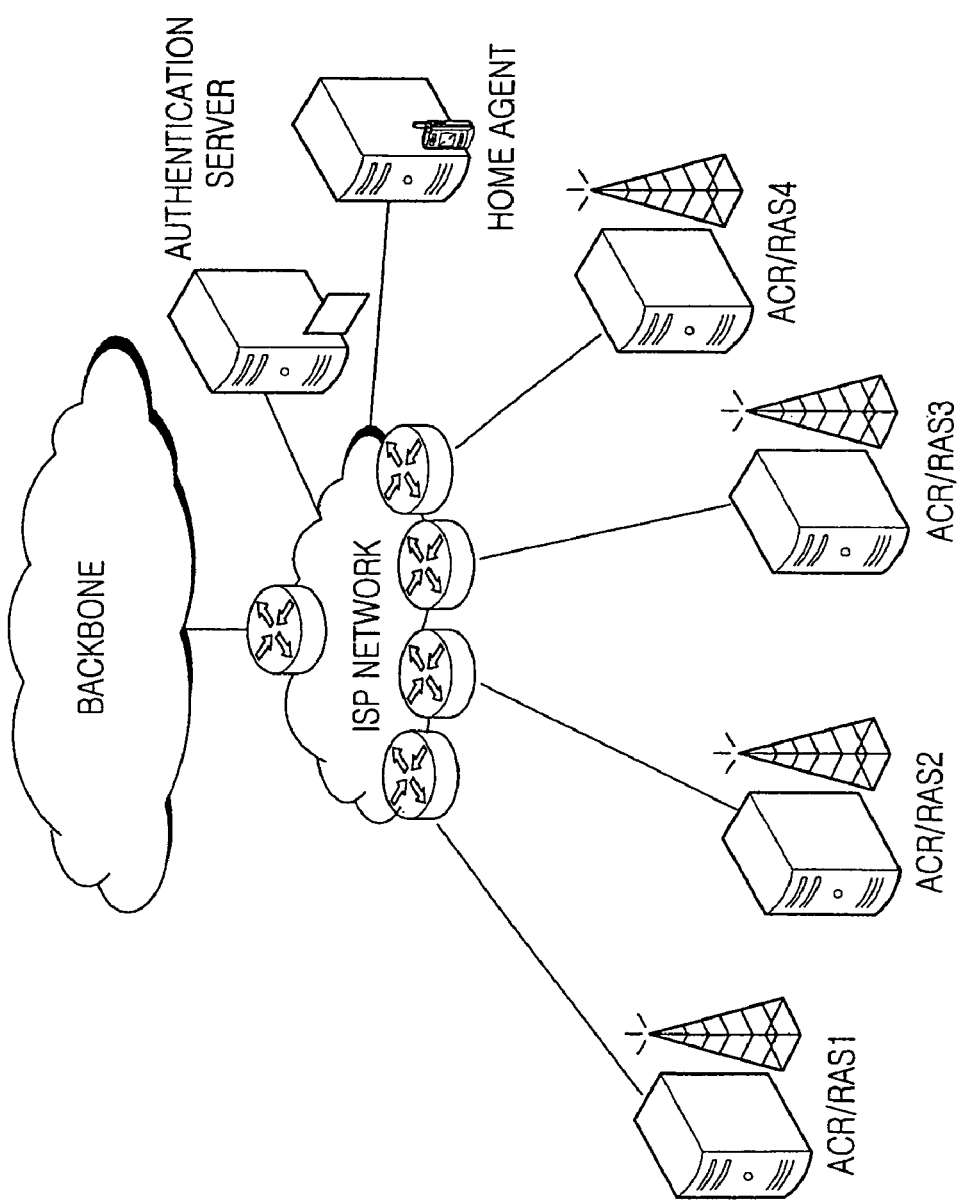

FIGS. 3A and 3B are diagrams illustrating possible configurations of a WiBro network equipped with FMIPv6 according to an exemplary embodiment of the present invention.

Referring to FIG. 3A, the network is divided into two subnets represented by ACR, and each ACR manages a plurality of RASs. In this case, not every inter-RAS movement always requires IPv6 mobility management. Because inter-RAS movement in a particular ACR becomes movement in the same subnet, it is also possible to maintain the communication using only the handover based on the WiBro standard without the IPv6 mobility management. However, in the case where an MS moves to a new subnet, like in the case where the MS moves from a RAS5 to a RAS6 in FIG. 3A, IPv6 mobility management and handover should be supported to maintain the session.

Referring to FIG. 3B, in the network, ACRs and RASs are mapped to each other on a one-to-one basis. In this case, the RAS and the ACR can be physically integrated into one network equipment. In this environment, because random movement of the MS always means movement to a new ACR, a mobility support protocol like MIPv6 should be supported to maintain the old session. Accordingly, the FMIPv6-based handover scheme proposed in the present invention can be applied to the case where the MS moves to a new subnet, i.e. the case where the MS moves to a new ACR in FIG. 3A, and to every movement in FIG. 3B.

Herein, a description of a tight interworking operation between a link layer and an IP layer and an optimized handover procedure based on FMIPv6 for minimizing a handover delay time according to the present invention will be separately made for the predictive mode and the reactive mode.

NRAS Information Acquisition

Once a target RAS candidate is determined using the neighbor network search/information acquisition method described in FIG. 2, the MS should acquire information on an ACR associated with the target RAS. The MS can acquire the information on the ACR connected to the target RAS through an exchange of the RtSolPr and PrRtAdv messages, which are Layer-3 messages proposed in FMIPv6. In order to obtain the information on the associated ACR as quickly as possible by immediately notifying detection of a new RAS in Layer 2 (L2) to Layer 3 (L3), the present invention defines New_RAS_Found as an inner primitive in the MS, as follows.

New_RAS_Found (New RAS IDs)
Sender: Layer 2 in MS
Recipient: Layer 3 in MS
Action during transmission: new target RAS candidate is found
Action during reception: RtSolPr message is sent to PACR Upon receipt of a New_RAS_Found message including IDs of new RASs, Layer 3 in the MS comprises the IDs in an RtSolPr message and rapidly sends the RtSolPr message to the PACR. Upon receipt of the RtSolPr message, the PACR sends a PrRtAdv message including a list of [BSID, ACR-Info] in response thereto. The ACR-Info comprises an IP and a MAC address of the NACR, and a prefix managed by the NACR. A process of gathering information on neighbor RASs, selecting a candidate RAS, and acquiring information on the NACR associated with the candidate RAS should not be necessarily performed at particular timing in the WiBro handover procedure, and the MS can perform the process at its convenient time like the idle time.

Handover Proposal

Next, a detailed description will be made of handover optimized through tight interworking between a WiBro standard for Layer 3 and a WiBro standard for Layer 2. The proposed handover procedure is roughly divided into (1) movement (or handover) preparation phase, (2) movement (or handover) execution phase, (3) WiBro network entry phase, and (4) movement (or handover) completion phase.

(1) Movement Preparation Phase

The MS finally determines handover to a target RAS and sends a MOB_MSHO-REQ message thereto. Upon receipt of an MS Handover Response (MOB_MSHO-RSP) message from the RAS, the MS starts the WiBro handover procedure in Layer 2. In order to minimize the handover time, Layer 2 of the MS should send a FBU message to the PACR without delay, after receiving MOB_BSHO-RSP/MOB_BSHO-REQ messages.

Conventionally, however, because the WiBro handover process of Layer 2 and the fast handover mechanism for Layer 3 independently operate, if the FBU message is sent before the MOB_BSHO-RSP/MOB_BSHO-REQ messages are received, or if FMIPv6, which is Layer 3, fails to detect receipt of the MOB_BSHO-RSP or MOB_BSHO-REQ message though it is received, sending of the FBU message is delayed causing a delay in the overall handover procedure. Therefore, there is a need for the following new primitive used for notifying receipt of the MOB_BSHO-RSP/MOB_BSHO-REQ messages in Layer 2 to Layer 3.

Link_Going_Down
Sender: Layer 2 in MS
Recipient: Layer 3 in MS
Action during transmission: MOB_BSHO-RSP or MOB_BSHO-REQ message is received
Action during reception: FBU message is sent to PACR Upon receipt of the FBU message from the MS, the PACR generates a PCoA-NCoA tunnel through an exchange of HI and HAck messages with the NACR, and tunnels data packets to the NCoA immediately after sending an FBAck message to the MS. The HAck message comprises uniqueness information for the NCoA, which is an address to be used in the target network.

According to the WiBro standard, if the MS sends a MOB_HO-IND message to the PRAS and the PRAS receives this message, the communication between the MS and the RAS is no longer permitted, even though a resource holding timer for the corresponding MS does not expire in the RAS. Therefore, in order to operate in the predictive mode, the MS should successfully exchange the FBU and FBAck messages with the PACR before sending the MOB_HO-IND message.

(2) Movement Execution Phase

If the MS has successfully received an FBAck message before handover execution and received uniqueness for the NCoA through the message, the MS should rapidly perform Layer-2 handover. In particular, because the PACR is already tunneling packets to the NCoA, the MS should perform handover as quickly as possible. This Layer-2 handover is initiated as the MS sends the MOB_HO-IND message to the PRAS. In order to allow the MS to send the MOB_HO-IND message immediately after receiving the FBAck message and to perform handover as quickly as possible, the present invention defines the following primitive.

Link_Switch
Sender: Layer 3 in MS
Recipient: Layer 2 in MS
Action during transmission: FBAck message is received
Action during reception: MOB_HO-IND message is sent to PRAS, and movement is performed This primitive, a kind of the command sent from Layer 3 to Layer 2, has a function of allowing Layer 3 of the MS to send a MOB_HO-IND message after receiving an FBAck message. That is, in order to help FMIPv6 operate in the predictive mode if possible, Layer 2 of the MS should delay sending of the MOB_HO-IND message until it receives the defined Link_Switch command.

Even though the MS fails to receive the FBAck message before sending the MOB_HO-IND message, if it moves at very high speed or quality of a downlink signal from the corresponding RAS abruptly deteriorates, the MS cannot but rapidly send the MOB_HO-IND message. In this case, FMIPv6 operates in the reactive mode. That is, the Link_Switch is used by the MS to rapidly start its movement immediately after movement preparation is completed in Layer 3, or to hold start of movement in Layer 2 until movement preparation of Layer 3 is completed. The use of the Link_Switch reduces the handover delay time and increases the probability of operating in the predictive mode if possible.

However, if a drop of the service is expected due to the abrupt deterioration of the signal quality from the corresponding RAS, the MS should start its movement to the NRAS even though Layer 3 of the MS has not completed the movement preparation. In this case, the Link_Switch message is not used, and the MS operates in the reactive mode after the handover.

(3) New Network Entry Phase

If the MS moves to a new network, it acquires synchronization with the NRAS and performs a network entry procedure. In this phase, the MS exchanges the RNG-REQ/RSP, SBC-REQ/RSP, PKM-REQ/RSP, REG-REQ/RSP messages with the NRAS. If the NRAS has already received session and configuration information of the MS from the PRAS before or during handover, a message exchange for the corresponding information can be omitted. With the completion of the network entry procedure, the handover process in Layer 2 is completed.

Immediately after completing the handover process, Layer 2 sends the following primitive to Layer 3.

Link_Up
Sender: Layer 2 in MS
Recipient: Layer 3 in MS

Action during transmission: network entry procedure is completed

Action during reception: FNA message is sent to NACR

Using the Link_Up, Layer 2 of the MS notifies to Layer 3 the possibility of exchanging packets through a link as Layer-2 handover is fully completed, and upon receipt of the notification, Layer 3 sends an FNA message to the NACR. In the reactive mode, Layer 3 should comprise the FBU message in the FNA message should.

(4) Handover Completion Phase

Upon receipt of the FNA message from the MS, the NACR sends the tunneling packets buffered therein during handover to the MS in the predictive mode. In the reactive mode, the NACR extracts the FBU message included in the received FNA message, sends the extracted FBU message to the PACR to establish a PCoA-NCoA tunnel, and finally forwards the packets received via the tunnel to the MS. In the reactive mode, the NACR should perform uniqueness check on the NCoA included in the FBU message.

Handover Scenario

This section shows the scenario in which the MS performs handover according to the proposed handover procedure in the predictive mode and the reactive mode.

Figure 4:
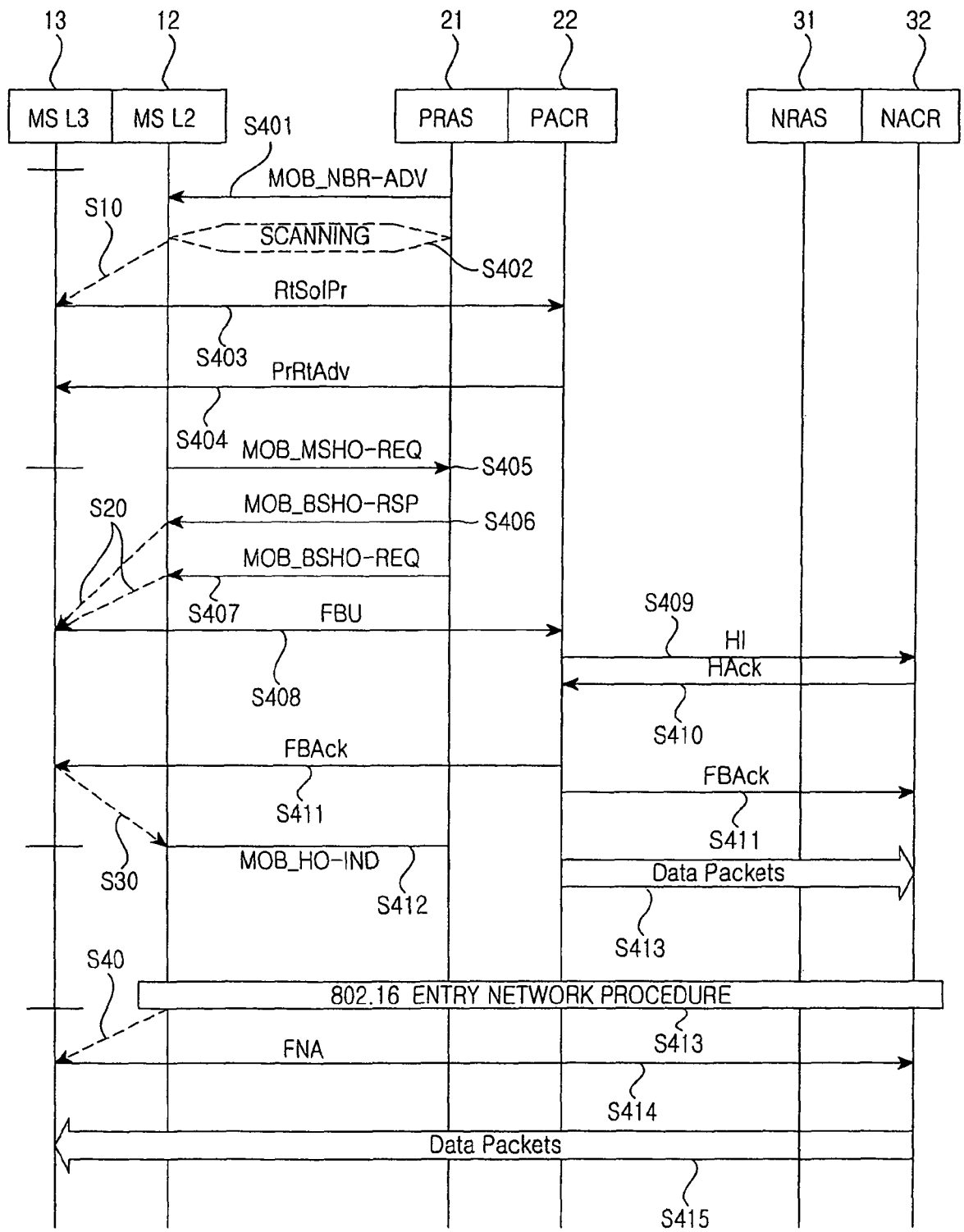
FIG. 4 is a message flow diagram illustrating a scenario in which an MS performs handover in the predictive mode according to an exemplary embodiment of the present invention.

FIG. 4 is a message flow diagram illustrating a scenario in which an MS performs handover in the predictive mode according to an exemplary embodiment of the present invention.

A PRAS 21 periodically broadcasts a MOB_NBR-ADV message in step S401. Upon discovering new neighbor RASs in this message, Layer-2 12 of an MS sends a New_RAS_Found message to Layer-3 13 of the MS in step S10. Before this, the MS can perform scanning to obtain detailed link information in step S402. Upon receipt of the New_RAS_Found message, Layer-3 13 of the MS acquires information on the ACR connected to the newly discovered RAS by exchanging RtSolPr and PrRtAdv messages with a PACR 22 in steps S403 and S404.

If the MS determines handover, it exchanges MOB_M-SHO-REQ and MOB_BSHO-RSP messages with the PRAS 21, and selects a target RAS, i.e. NRAS, in steps S405 and S406. Alternatively, the PRAS 21 can start handover by sending a MOB_BSHO-REQ message to the MS in step S407. Upon receipt of a MOB_BSHO-RSP or MOB_BSHO-REQ message from the PRAS 21 in response to the MOB_MSHO-REQ message in step S406 or S407, Layer-2 12 of the MS generates Link_Going_Down to notify the receipt to Layer-3 13 in step S20. Upon receipt of the Link_Going_Down, Layer-3 13 of the MS exchanges FBU and FBAck messages with the PACR 22 in steps S408 and S411. Prior to sending the FBAck message, the PACR 22 exchanges HI and HAck messages with an NACR 32 to establish a tunnel in steps S409 and S410. The NACR 32 notifies uniqueness of the NCoA through the HAck message. At this moment, the packets are tunneled to the NCoA.

Upon receipt of the FBAck message in step S411, the MS allows Layer 2 to send a MOB_HO-IND message, using Link_Switch in steps S30 and S412.

The MS performs the network entry procedure according to the WiBro standard in step S413. After completion of the network entry procedure, Layer-2 12 of the MS generates Link_Up to notify the completion to Layer-3 13 in step S40, and Layer-3 13 immediately sends an FNA message to the NACR 32 in step S414. Upon receipt of the FNA message from the MS, the NACR 32 starts forwarding of the tunneling packets buffered for the corresponding MS in step S415.

Figure 5:
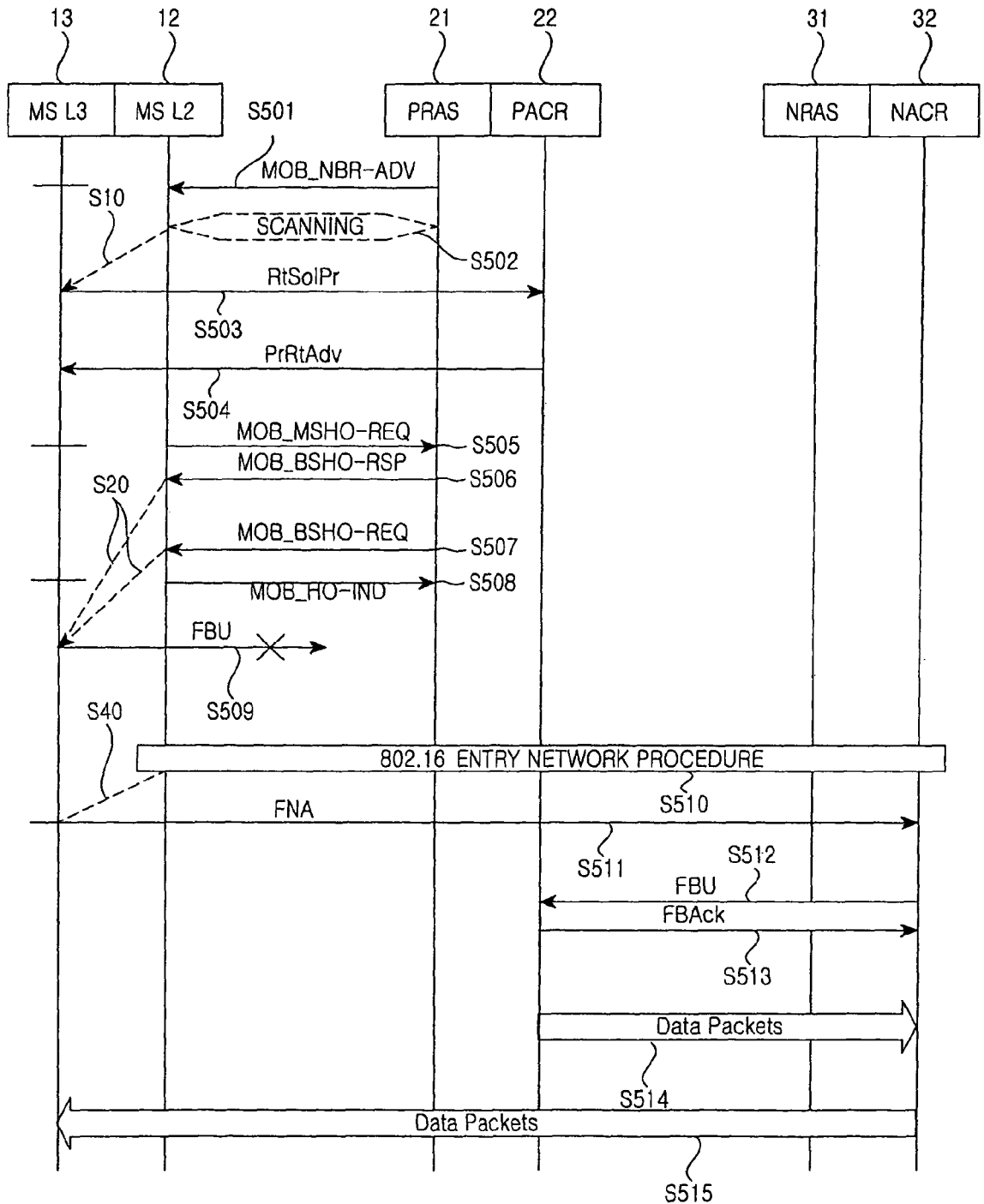
FIG. 5 is a message flow diagram illustrating a scenario in which an MS performs handover in the reactive mode according to an exemplary embodiment of the present invention.

FIG. 5 is a message flow diagram illustrating a scenario in which an MS performs handover in the reactive mode according to an exemplary embodiment of the present invention.

A PRAS 21 periodically broadcasts a MOB_NBR-ADV message in step S501. Upon discovering new neighbor RASs in this message, Layer-2 12 of an MS sends a New_RAS_Found message to Layer-3 13 of the MS in step S10. Before this, the MS can perform scanning to obtain detailed link information in step S502. Upon receipt of the New_RAS_Found message, Layer-3 13 of the MS acquires information on the ACR connected to the newly discovered RAS by exchanging RtSolPr and PrRtAdv messages with a PACR 22 in steps S503 and S504.

If the MS determines handover, it exchanges MOB_M-SHO-REQ and MOB_BSHO-RSP messages with the PRAS 21, and selects a target RAS, i.e. NRAS, in steps S505 and S506. Alternatively, the PRAS 21 can start handover by sending a MOB_BSHO-REQ message to the MS in step S507. Upon receipt of a MOB_BSHO-RSP or MOB_BSHO-REQ message from the PRAS 21 in response to the MOB_MSHO-REQ message in step S506 or S507, Layer-2 12 of the MS generates Link_Going_Down to notify the receipt to Layer-3 13 in step S20. Upon receipt of the Link_Going_Down, Layer-3 13 of the MS immediately sends a FBU message to the PACR 22. In step S509, the MS operates in the reactive mode, if it cannot send the FBU message, or if it fails to receive an FBAck message in response to the FBU message even though it has sent the FBU message.

The MS performs the network entry procedure according to the WiBro standard in step S510. After completion of the network entry procedure, Layer-2 12 of the MS generates Link_Up to notify the completion to Layer-3 13 and Layer-3 13 immediately sends an FNA message to the NACR 32 in step S511. The MS comprises the FBU message in the FNA message because it operates in the reactive mode.

Upon receipt of the FNA message, the NACR 32 checks uniqueness of the NCoA included therein. If the NCoA is unique, the NACR 32 generates a tunnel by exchanging FBU and FBAck messages with the PACR 22, and finally sends the tunneling packets to the MS in steps S512, S513 and S514. If the NCoA is already in use, the NACR 32 sends a PrRtAdv message including a NACK message to the MS and discards the FBU message in step S515.

For performance analysis of the present invention, a definition will be given of a packet-level traffic model, a system model, and MS mobility model. With the use of these models, performance of FMIPv6 will be analyzed hereinbelow. The important analysis criterion is an L2/L3 handover delay time required for one movement.

System and Mobility Model

Figure 6A:
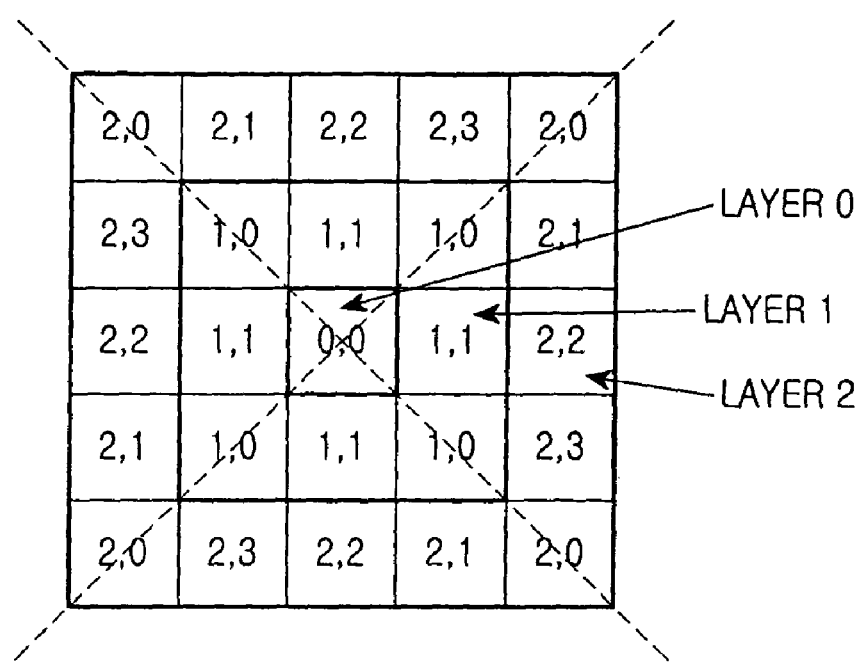
FIG. 6A is a diagram illustrating a configuration of a Layer-3 subnet according to an exemplary embodiment of the present invention.
Figure 6B:
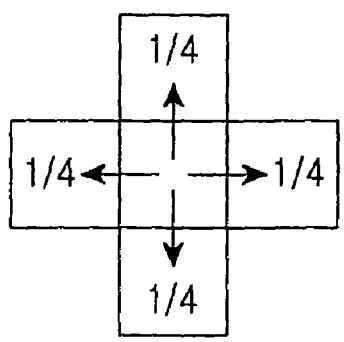
FIG. 6B is a diagram illustrating movement pattern and probability of an MS according to an exemplary embodiment of the present invention.

FIG. 6A is a diagram illustrating a configuration of a Layer-3 subnet according to an exemplary embodiment of the present invention, and FIG. 6B is a diagram illustrating movement pattern and probability of an MS according to an exemplary embodiment of the present invention.

Referring to FIGS. 6A and 6B, one subnet is generally composed of more than one RAS areas. For convenience, it is assumed that every RAS area has a mesh-type rectangular structure having the same shape and size. It is also assumed that an MS moves along a 2-dimensional Random Walk Model. The present invention compares signaling cost and handover time for only one MS without taking into account the MSs scattered under the RAS and the ACR.

If a particular subnet is composed of $N=4n^2-4n+1$ RAS areas, this subnet is called an n–layer subnet. FIG. 6A shows a 3-layer subnet configuration. Subnets are named layer 0, layer 1, layer 2 . . . , drawing a ring from the center, and a RAS area surrounding a layer x-18 RAS area is called layer x RAS area. An n-layer subnet is composed of a layer 0 RAS area to a layer n-1 RAS area.

Assuming that after staying in one RAS area for a certain time, an MS moves to one of 4 neighbor RAS areas at the same probability (i.e. ¼) as shown in FIG. 6B, all RAS areas in one subnet can be divided into several RAS area <x,y> groups. The RAS area groups are distinguished by shape. Herein, x indicates that the RAS area is in layer x, and y indicates that a corresponding group is a $(y+1)^{th}$ group in layer x. The RAS areas having the same shape show the same movement pattern. FIG. 6A shows the shapes of the RAS areas for the 3-layer subnet.

Figure 7:
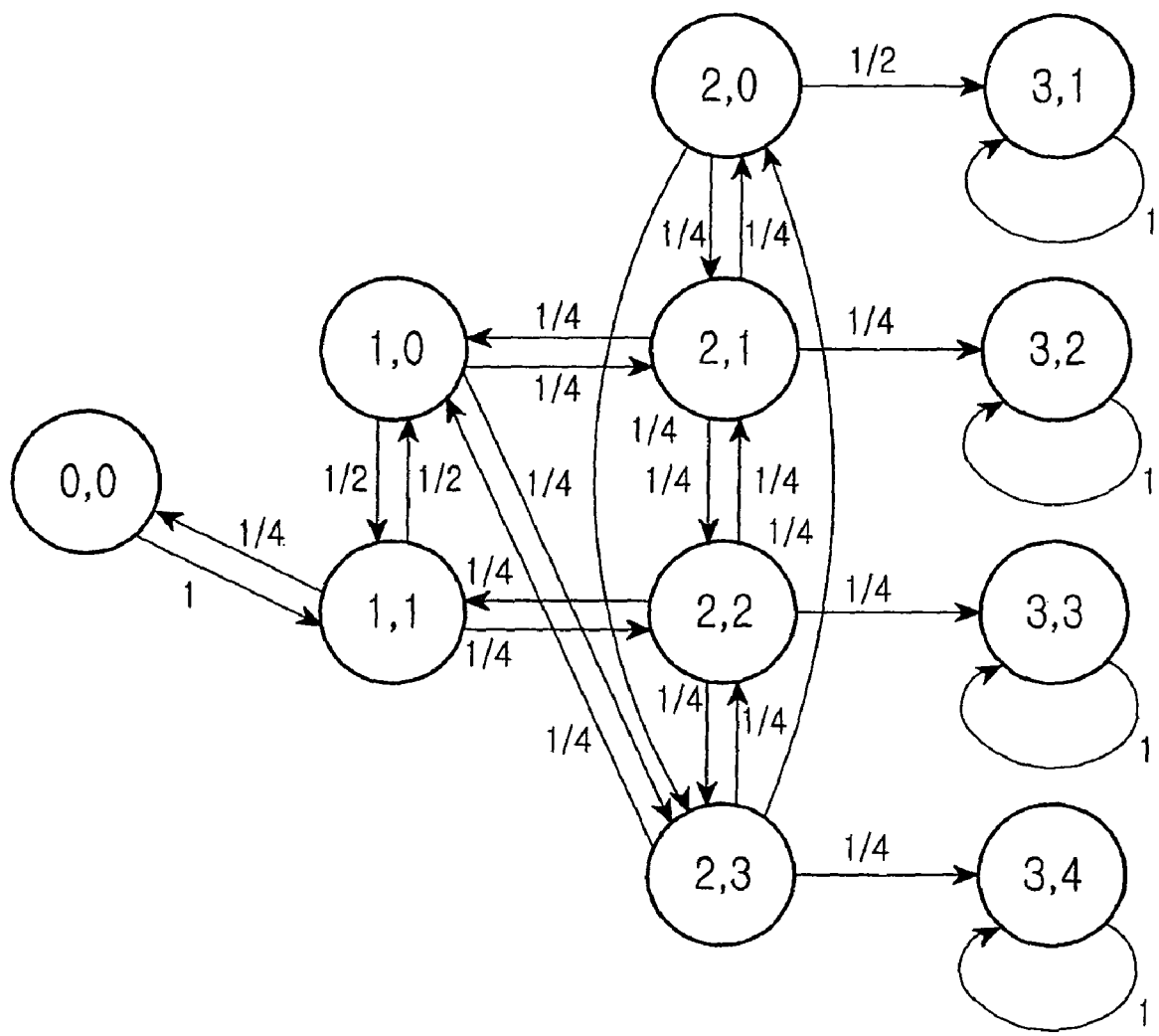
FIG. 7 is a state transition diagram for a movement shape of an MS based on a random walk model according to an exemplary embodiment of the present invention.

FIG. 7 is a state transition diagram for a movement shape of an MS based on a random walk model according to an exemplary embodiment of the present invention.

Referring to FIG. 7, in the random walk model, a state (x,y) indicates that a particular MS is located in one of RAS areas of an <x,y> group. For $0 \leq j \leq 2n-3$, an absorbing state (n,j) means that the MS leaves the corresponding subnet from the state. A transition matrix $P=(p_{(x,y)(x',y')})$ for the random walk state transition diagram is expressed as $$P = \begin{pmatrix} 0 & 0 & 1 & 0 & 0 & \cdots & 0 & 0 & 0 \\ 0 & 0 & \frac{1}{2} & 0 & \frac{1}{4} & \cdots & 0 & 0 & 0 \\ \frac{1}{4} & \frac{1}{2} & 0 & 0 & 0 & \cdots & 0 & 0 & 0 \\ 0 & 0 & 0 & 0 & \frac{1}{4} & \cdots & 0 & 0 & 0 \\ \vdots & \vdots & \vdots & \vdots & \vdots & \ddots & \vdots & \vdots & \vdots \\ 0 & 0 & 0 & 0 & 0 & \cdots & 1 & 0 & 0 \\ 0 & 0 & 0 & 0 & 0 & \cdots & 0 & 1 & 0 \\ 0 & 0 & 0 & 0 & 0 & \cdots & 0 & 0 & 1 \end{pmatrix} \quad (1)$$

With the use of the matrix P, a matrix $P^{(k)}$ can be found using an Chapman-Kolmogorov equality. For $k \geq 1$, a particular element $p_{(x,y)(x',y')}^{k}$ of $P^{(k)}$ means the probability that the MS will move from a state (x,y) to a state (x',y') exactly in k steps.

Using the two matrixes P and $P^{(k)}$, $p_{k,(x,y),(n,j)}$ can be finally defined as $$p_{k,(x,y)(n,i)} = \begin{cases} p_{(x,y)(n,i)} & \text{for } k = 1 \\ p_{(x,y)(n,i)} - p_{(x,y)(n,i)}^{k-1} & \text{for } k > 1 \end{cases} \quad (2)$$

From Equation (2), $p_{k,(x,y),(n,j)}$ means the probability that an MS, which was initially located in one of RASs of an <x,y> group, will move to a RAS of an <n-1,j> group in a $k-1^{th}$ step, and then leave the corresponding subnet in the last step.

For $0 \leq j \leq 2n-3$, $q_{(n-1,j)}$ is defined as the probability that the MS will enter the subnet via a RAS area with a <n-1, j> shape. Similarly, $\tilde{q}_{(n-1,j)}$ is defined as the probability that the MS will leave the subnet via a RAS area with a <n-1,j> shape. For n>2 and $0 \leq j \leq 2n-3$, $$\sum_{i=0}^{2n-3} \tilde{q}_{(n-1,i)} = 1 \quad (3)$$

$$\tilde{q}_{(n-1,i)} = \sum_{k=1}^{\infty} \sum_{y=0}^{2n-3} q_{(n-1,y)} p_{k,(n-1,y)(n,i)}$$

Figure 8:
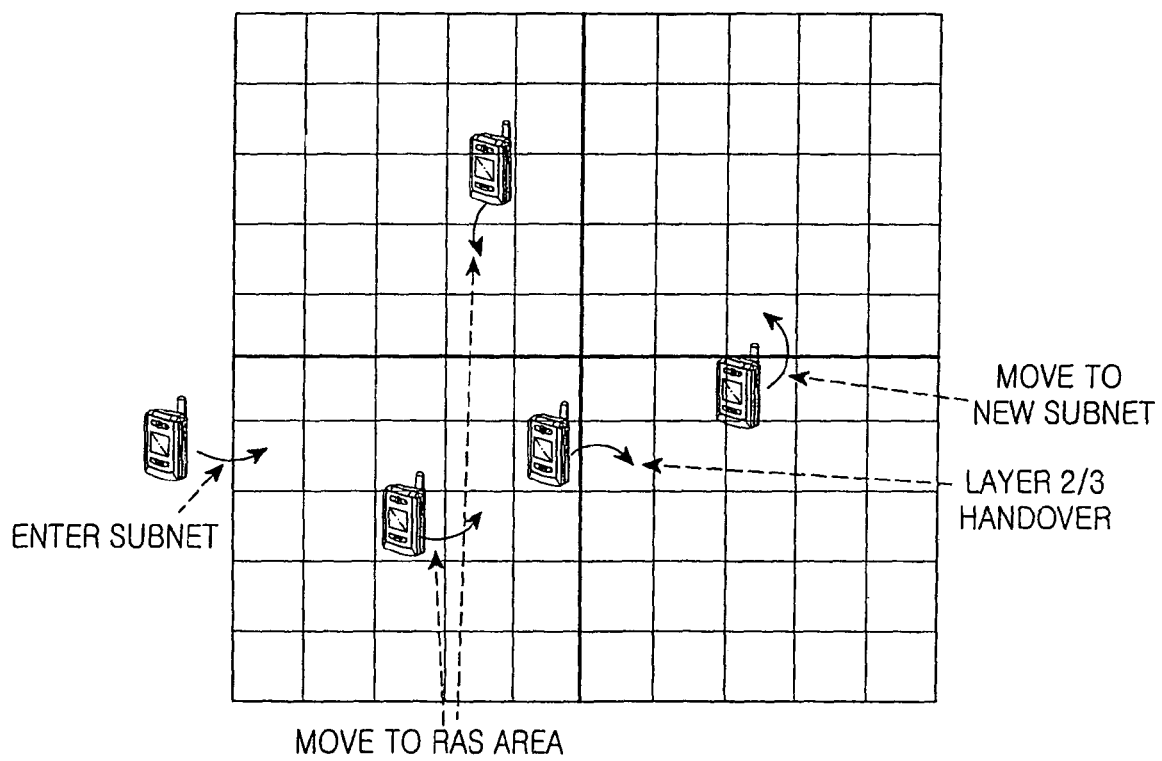
FIG. 8 is a diagram illustrating RAS areas, subnet areas, and a movement pattern of an MS according to an exemplary embodiment of the present invention.

In Equation (3), the right detailed formulas mean the product of the probabilities that the MS, which was initially located in an <n-1,y> RAS area, leaves its current subnet in the <n-1,y> RAS area after $k^{th}$ movement. From FIG. 6A and FIG. 8 that shows RAS areas, subnet areas, and a movement pattern of an MS according to an exemplary embodiment of the present invention, it can be noted that $$\bar{q}_{n-1,j} = q_{n-1,j} \quad (4)$$

From the foregoing equations, a linear system and a solution for $q_{n-1,j}$ can be obtained. For a 2-layer subnet, $q(1,0) \approx 66.667\%$ and $q(1,1) \approx 33.333\%$ can be obtained. For a 3-layer subnet, $q(2,0) \approx 40\%$, and for $0 < j \leq 3$, $q(2,j) \approx 20\%$ can be obtained. In addition, for a 4-layer subnet, q $(3,0) \approx 28.571\%$ and for $0 < j \leq 5$, $q(3,j) \approx 14.285\%$. Finally, for a 5-layer subnet, $q(4,0) \approx 22.222\%$, and for $0 < j \leq 7$, $q(4,j) \approx 11.111\%$ can be found. These probabilities can be extended up to a particular layer in the same method. In finding the solution, 500 terms are summed up for the sum up to the infinite. In this case, an error is below $10^{-17}$.

Finally, if it is assumed that the MS moves over M RAS areas until it leaves a particular subnet after it entered the subnet, then E[M]=1 for n=1, and for $n \geq 2$, E[M] is $$B[M] = \sum_{k=1}^{\infty} \sum_{y=0}^{2n-3} \sum_{i=0}^{2n-3} q_{(n-1,y)} p_{k,(n-1,y)(n,i)} k \quad (5)$$

Performance Evaluation Result

An FMIPv6 handover delay time, which is the object of evaluation in the present invention, is defined as a difference between a time of the last packet received in the previous RAS area and a time of a first (tunneling) packet received in a new RAS area. Meanwhile, a Layer-2 handover delay time disclosed in IEEE 802.16e is defined as a difference between the time at which the MS sends a MOB_HO-IND message in the previous RAS area and the time at which the MS sends a Link_Up trigger to Layer 3 after completing the network entry process in the new RAS area.

To accurately find the FMIPv6 handover delay time together with these definitions, a definition of the following parameters is given.

$D_1$: time required for sending a MOB_HO-IND message after receiving an FBAk message and the last packet from PACR $D_2$: Layer ½ handover delay time $D_3$: time required for sending an FNA message after receiving a Link_Up trigger $D_4$: time required for forwarding packets from an MS to an NACR (or from the NACR to the MS)

$D_5$: delay time for a uniqueness test on an NCoA, performed in the NACR $D_6$: time required by packets to arrive from the NACR at the PACR (or from the PACR at the NACR)

Figure 9:
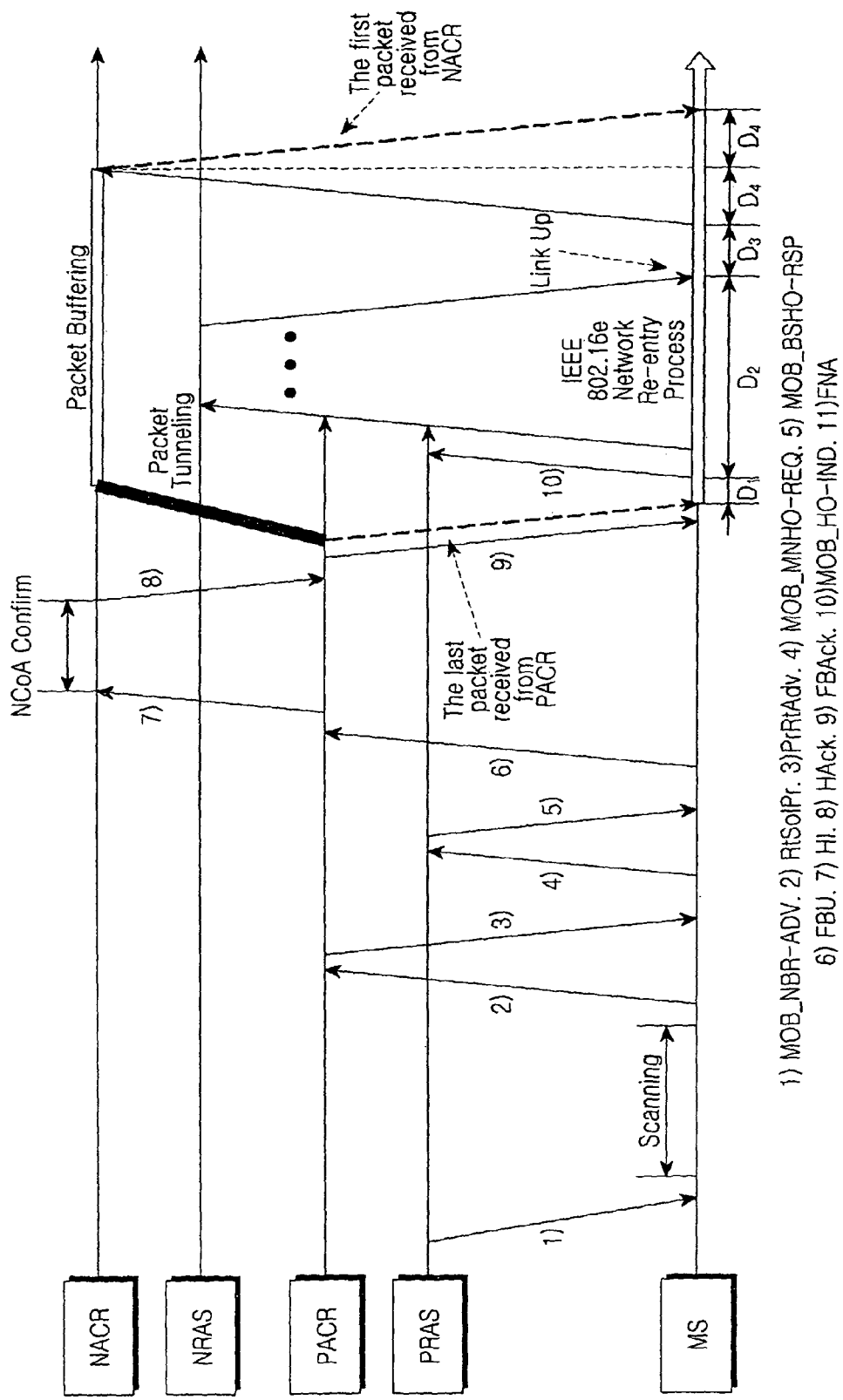
FIG. 9 is a diagram illustrating performance evaluation on FMIPv6 over IEEE 802.16 operating in the predictive mode according to an exemplary embodiment of the present invention.

$D_7$: time required until the MS starts data packet tunneling after receiving the FBU message from the PACR FIG. 9 is a diagram illustrating performance evaluation on FMIPv6 over IEEE 802.16 operating in the predictive mode according to an exemplary embodiment of the present invention. For simple and clear expression of the present invention, if every handover-related signaling and data is equal in its source and destination, it is assumed that the signaling and data has the same delay time regardless of its size.

Referring to FIG. 9, when the predictive mode of FMIPv6 is used, a handover delay time during inter-ACR movement is $$\text{Handover delay time} = D_1 + D_2 + D_3 + 2D_4 \quad (6)$$

When the predictive mode of FMIPv6 is used taking into account only the inter-RAS movement as well without the inter-ACR movement, an average handover delay time $H_P$ required during certain movement of the MS is $$H_P = \frac{(E[M]-1)D_2 + D_1 + D_2 + D_3 + 2D_4}{E[M]} \quad (7)$$
$$= D_2 + \frac{D_1 + D_3 + 2D_4}{E[M]}$$

Figure 10:
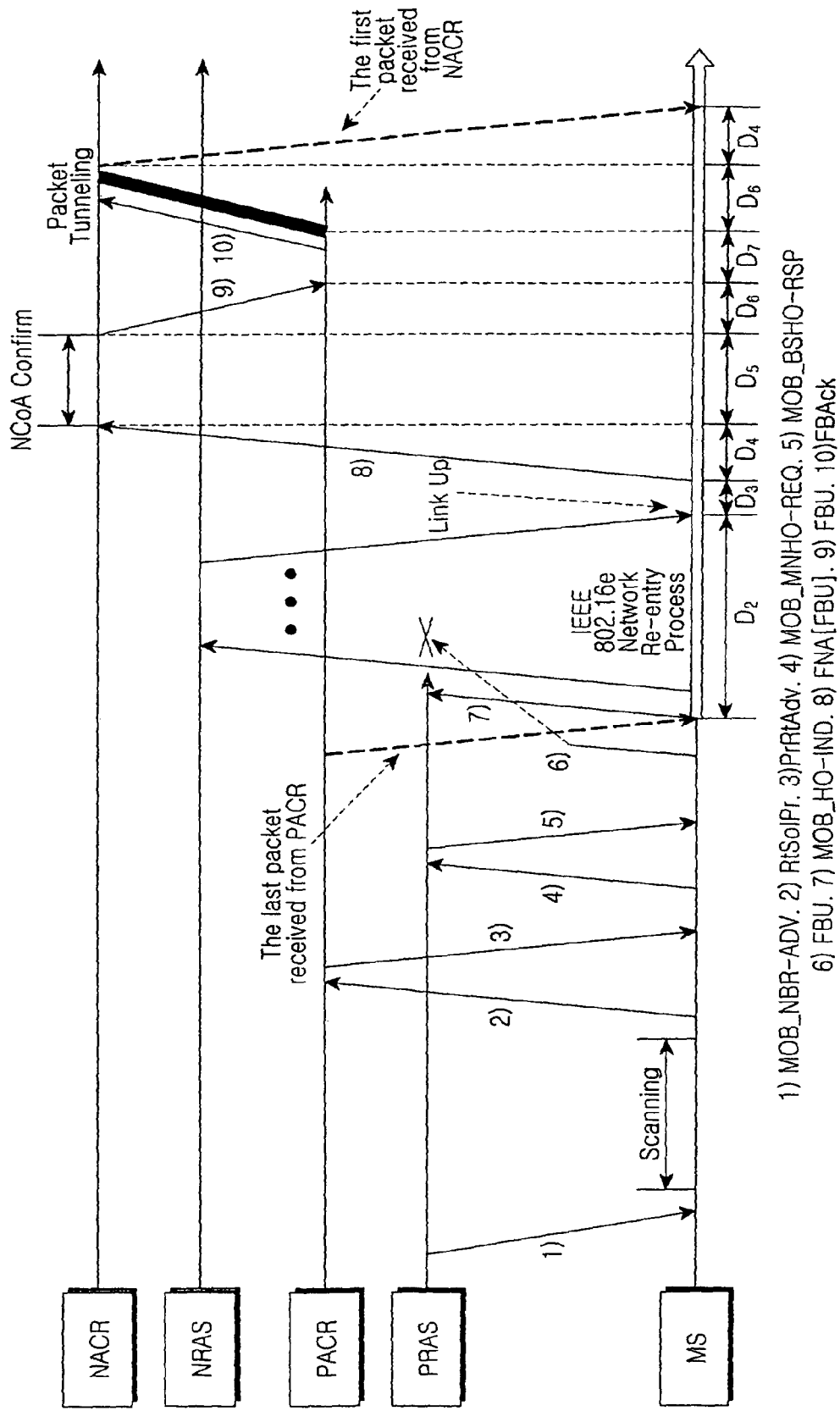
FIG. 10 is a diagram illustrating performance evaluation on FMIPv6 over IEEE 802.16 operating in the reactive mode according to an exemplary embodiment of the present invention.

FIG. 10 is a diagram illustrating performance evaluation on FMIPv6 over IEEE 802.16 operating in the reactive mode according to an exemplary embodiment of the present invention.

Referring to FIG. 10, when the reactive mode of FMIPv6 is used, a handover delay time during inter-ACR movement is $$D_2 + D_3 + 2D_4 + D_5 + 2D_6 + D_7 \quad (8)$$

When the reactive mode of FMIPv6 is used taking into account only the inter-RAS movement as well without the inter-ACR movement, an average handover delay time $H^R$ required during certain movement of the MS is $$H_R = \frac{(E[M]-1)D_2 + D_2 + D_3 + 2D_4 + D_6 + 2D_6 + D_7}{E[M]} \quad (9)$$
$$= D_2 + \frac{D_3 + 2D_4 + D_6 + 2D_6 + D_7}{E[M]}$$

A basic value list for each parameter to be used for performance analysis is shown in Table 1. These values are hypothesized values, and can undergo various changes depending on wireless environment, network configuration, and protocol realization method in MS, RAS and ACR.

TABLE 1

| Parameter | Value |
| --- | --- |
| $D_1 = D_3 = D_7 28888888$ | 5 ms |
| $D_2$ | 30 ms |
| $D_4$ | 2 ms |
| $D_5$ | 10 ms |
| $D_6$ | 3 ms |

Figure 11:
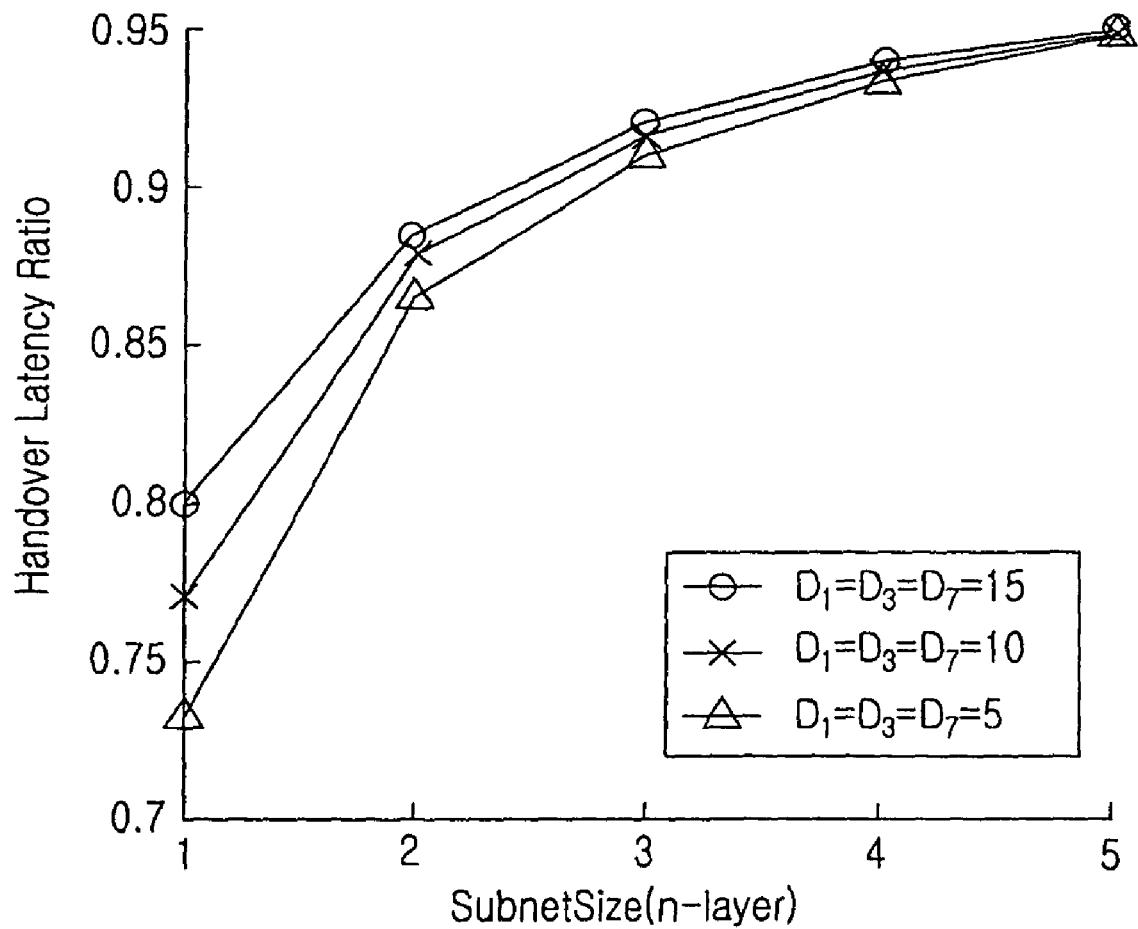
FIG. 11 is a graph illustrating average handover delay times of the predictive mode and the reactive mode of FMIPv6 using parameter values according to an exemplary embodiment of the present invention.

FIG. 11 is a graph illustrating average handover delay times of the predictive mode and the reactive mode of FMIPv6 using parameter values according to an exemplary embodiment of the present invention.

Referring to FIG. 11, it can be noted that as a size of a subnet is larger, i.e. as the number of RASs in one subnet is greater, an average handover delay time of the MS is shorter. This result is caused by the decrease in the number of the cases where L3 handover of a network level occurs. It can be understood that when every RAS is composed of one subnet (i.e. n=1), the handover delay times of the reactive mode and the predictive mode are higher 2 times and 1.5 times than the Layer-½ average handover delay time (30 ms), respectively. Finally, it can also be noted that as a size of the subnet is larger, a performance difference between the predictive mode and the reactive mode is smaller.

Figure 12:
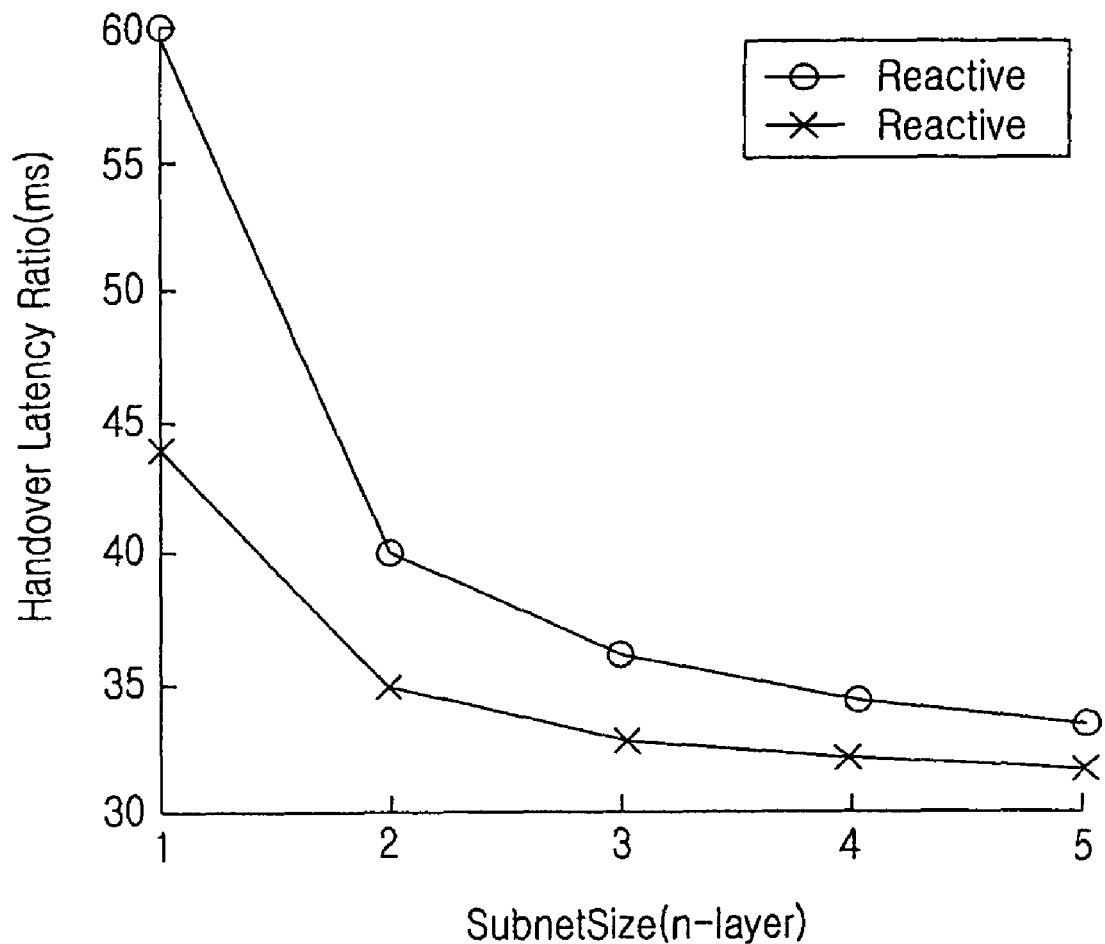
FIG. 12 is a graph illustrating the analysis result on how the MS/ACR inner processing delay time among the parameters according to an exemplary embodiment of the present invention affects the total handover delay time.

FIG. 12 is a graph illustrating the analysis result on how the MS/ACR inner processing delay time among the parameters according to an exemplary embodiment of the present invention affects the total handover delay time.

Referring to FIG. 12, in this analysis, a radio $H_P/H_R$ determined by dividing the predictive mode handover delay time by the reactive mode handover delay time is defined as a metric. Therefore, it can be noted that as the ratio $H_P/H_R$ is lower, the predictive mode is superior to the reactive mode in terms of the performance.

As could be understood from FIG. 10, it can be noted that as the size of the subnet is larger, the predictive mode is not so superior to the reactive mode in performance. That is, to maximize an effect of the predictive mode, it is necessary to reduce the subnet size if possible.

It is also noted that the MS and the ACR should complete the inner processing if possible in order to increase the performance of the predictive mode. From this result, it can be appreciated that the performance of the predictive mode is susceptible to the inner processing delay time.

Figure 13:
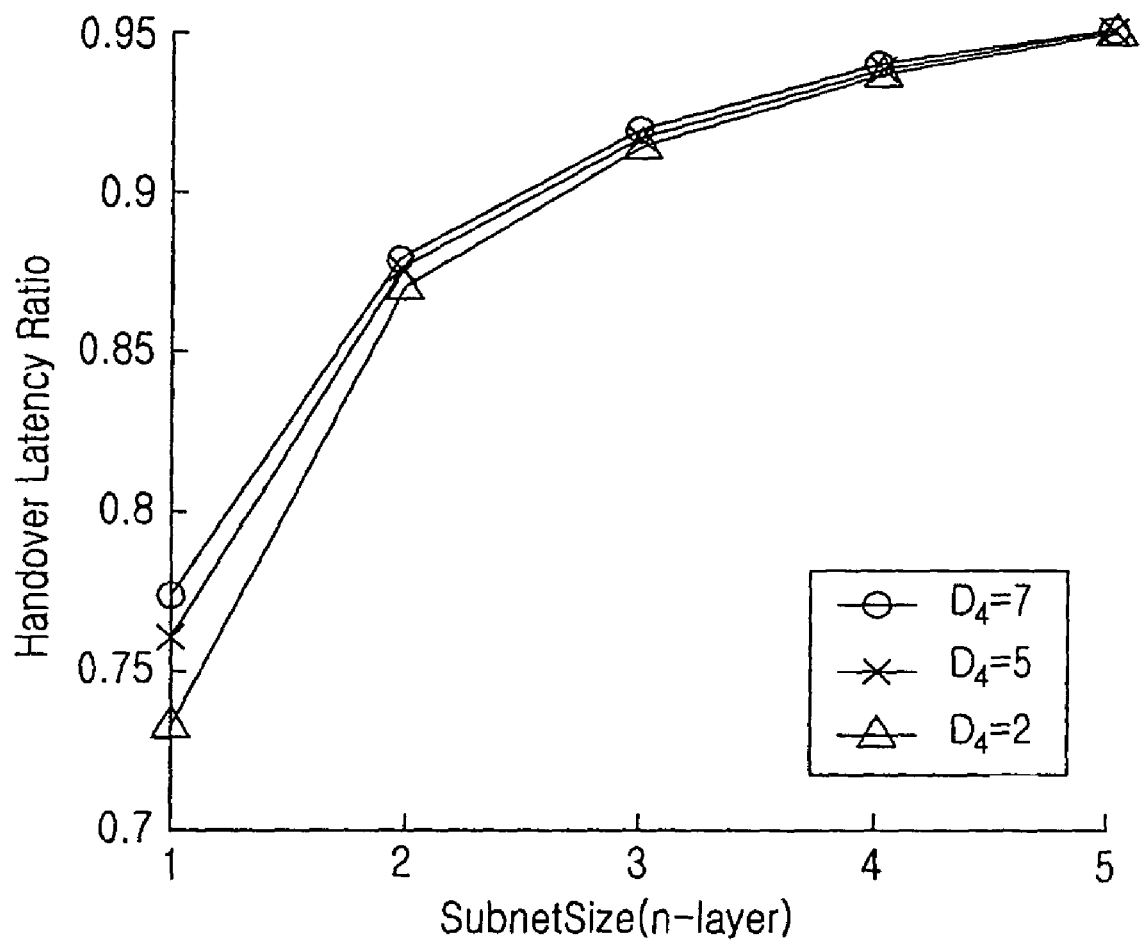
FIG. 13 is a graph illustrating the analysis result on the change in the $H_P/H_R$ value for a parameter $D_4$, i.e. a packet forwarding time from the MS to the NACR (or from the NACR to the MS)

FIG. 13 is a graph illustrating the analysis result on the change in the $H_P/H_R$ value for a parameter $D_4$, i.e. a packet forwarding time from the MS to the NACR (or from the NACR to the MS).

Similarly to the analysis shown in FIG. 5, it can be noted that as the $D_4$ value is smaller, the predictive mode is superior to the reactive mode in performance. That is, it can be understood that the performance of the predictive mode is susceptible to the packet forwarding time from the MS to the NACR (or from the NACR to the MS). It can also be appreciated from FIG. 5 that there is almost no performance difference between the predictive mode and the reactive mode in the environment where Layer-½ handover is much greater than Layer-3 handover in the number of handover occurrences due to the considerably large size of the subnet.

Figure 14:
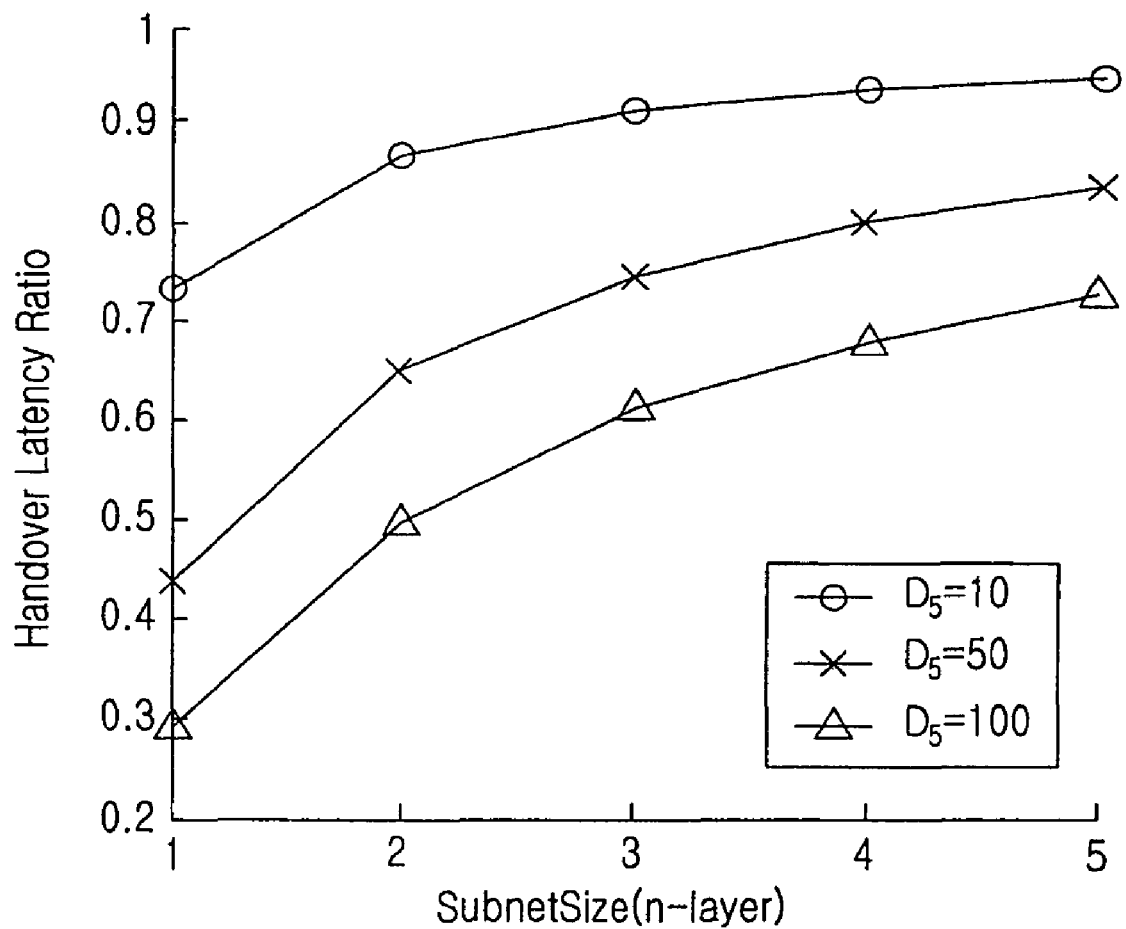
FIG. 14 is a graph illustrating the analysis result on the change in the $H_P/H_R$ value for the parameter $D_6$, i.e. the uniqueness test delay time for the NCoA, performed in the NACR.

The analysis result on the change in the $H_P/H_R$ value for the parameter $D_6$, i.e. the uniqueness test delay time for the NCoA, performed in the NACR, is illustrated in FIG. 14.

FIG. 14 is a graph illustrating the analysis result on the change in the $H_P/H_R$ value for the parameter $D_6$, i.e. the uniqueness test delay time for the NCoA, performed in the NACR.

Referring to FIG. 14, $D_6$ greatly affects the predictive mode and reactive mode performances. The reason is because the uniqueness test delay time for the NCoA, performed in the NACR, is a factor of the handover delay time in the reactive mode, whereas the uniqueness test delay time is not the factor of the handover delay time in the predictive mode. Therefore, it can be appreciated that as the $D_6$ value is greater, the predictive mode is much superior to the reactive mode in performance. It is remarkable that that unlike the parameters $D_1$, $D_3$, $D_4$ and $D_7$, the $D_6$ value affects the $H_P/H_R$ value regardless of the subnet size.

Figure 15:
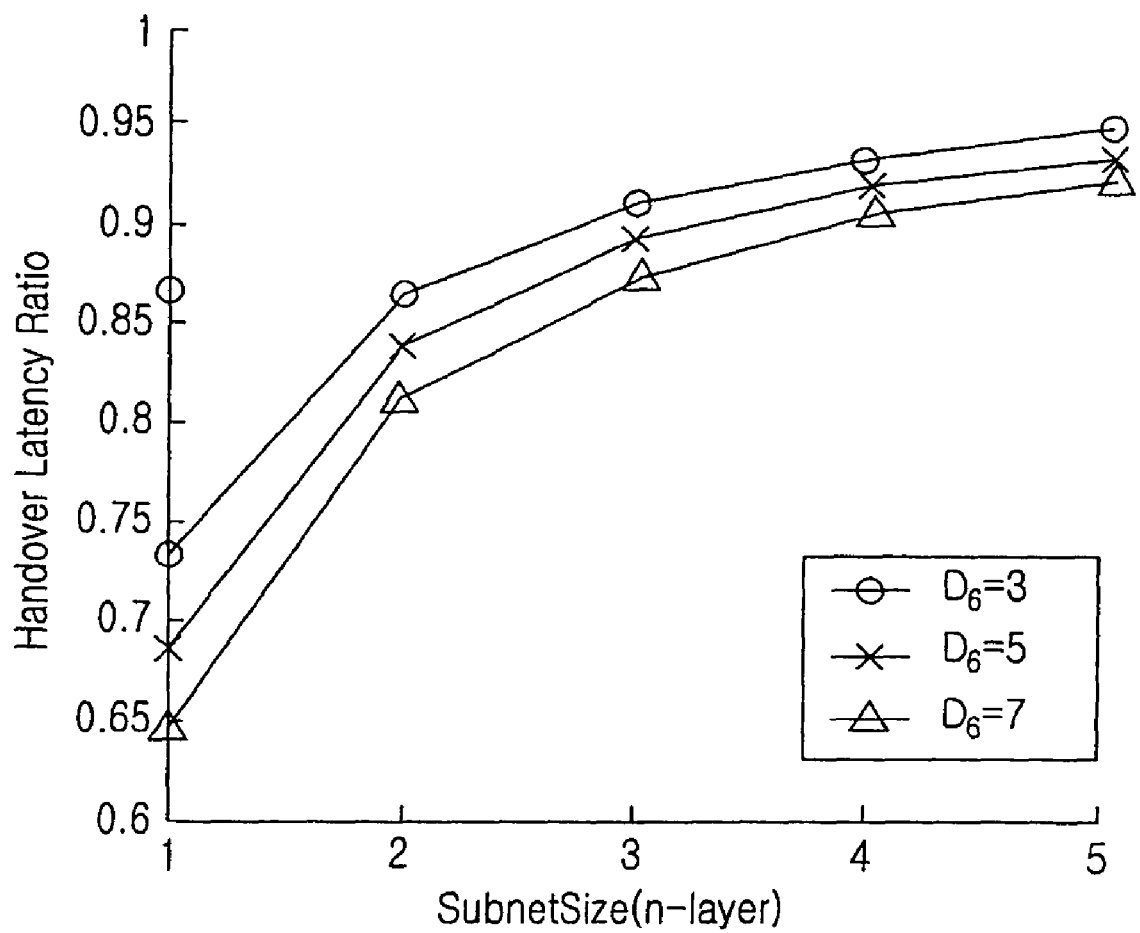
FIG. 15 is a graph illustrating the analysis result on the change in the $H_P/H_R$ value for the parameter $D_6$, i.e. the packet arrival time from the NACR to the PACR (or from the PACR to the NACR) according to an exemplary embodiment of the present invention.

FIG. 15 is a graph illustrating the analysis result on the change in the $H_P/H_R$ value for the parameter $D_6$, i.e. the packet arrival time from the NACR to the PACR (or from the PACR to the NACR) according to an exemplary embodiment of the present invention.

It can be noted from FIG. 15 that similarly to the analysis result on the $D_6$, the $D_6$ value also affects the $H_P/H_R$ value regardless of the subnet size. The $D_6$ is a factor of the handover delay time of the reactive mode. However, the $D_6$ is not the factor of the handover delay time in the predictive mode. Therefore, as the $D_6$ value is greater, the predictive node is higher than the reactive mode in the performance, Summarizing the present invention, the WiBro advocates handover technology for supporting a moving user as well as the conventional fixed user, as its core function. Therefore, the standard specification for movement between two RASs under a single ACR (single subnet) is already well defined. However, there is no standard mentioning in detail the IP handover technology between two ACRs (different subnets), which should be taken into account when performing IPv6 service in the WiBro network.

The present invention describes the detailed technology related to the network search, movement preparation, movement execution, network entry and movement completion, which should be taken into account when applying FMIPv6 that is IPv6 handover technology recently established as RFC in IETF, to the WiBro network. In particular, the present invention proposes the primitives used for interworking between Layer 2 and Layer 3, necessary for every handover execution step, as shown in Table 2.

In addition, the present invention proposes how to efficiently operate the FMIPv6 handover procedure and the WiBro handover procedure using these primitives separately for the predictive mode and the reactive mode, and presents the detailed scenario.

Finally, in the performance evaluation section, the present invention derived the delay time parameters while redeveloping the overall handover process along the time axis, and analyzed the handover delay time of FMIPv6 in the WiBro network while hypothesizing an appropriate value for each of the derived parameters. Although it may undergo a considerable change according to parameter value, it could be noted from the analysis result that when FMIPv6 is used under an appropriate parameter value, the integrated Layer-2/Layer-3 handover delay time is distributed over 30~40 ms for the predictive mode, and 35~60 ms for the reactive mode. In addition, it was verified that compared with the reactive mode, the predictive mode could reduce the handover delay time by almost 5~30% according to several parameter values.

TABLE 2

| Primitive | Tx direction | Description |
|---|---|---|
| New_RAS_Found | L2->L3 | Because a new RAS is discovered, Layer 2 notifies to Layer 3 the necessary of acquiring information on the ACR connected to the RAS. |
| Link_Going_Down | L2->L3 | Because it is determined that handover is imminent due to the gradual decrease in the strength of a signal detected in the link, Layer 2 notifies to Layer 3 the need for preparing the handover procedure. |
| Link_Switch | L3->L2 | Because Layer-3 handover preparation is completed, Layer 3 instructs Layer 2 to perform substantial handover. |
| Link_Up | L2->L3 | After the handover, Layer 2 notifies to Layer 2 the possibility of using the link after completing the network entry process in the new link. |

As can be understood from the foregoing description, the handover method according to the present invention defines the primitives for interworking between the MAC layer and the IP layer, and optimizes the FMIPv6 handover procedure and the WiBro handover procedure using these primitives, thereby minimizing the handover delay time of the MS.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A handover method of a mobile station (MS) in a mobile communication system including MSs, radio access stations (RASs), and access control routers (ACRs), each of which includes an IEEE 802.16 standard-based medium access control (MAC) layer and an Internet protocol version 6 (IPv6)-based IP layer, the method comprises:

gathering IP network information of a neighbor RAS through a message exchange with a previous ACR;

determining a target RAS for handover based on the gathered IP network information of the neighbor RAS gathered from the previous ACR;

after the target RAS is determined, tunneling, by the previous ACR, data for targeting the MS to the target RAS; and receiving the tunneled data from the target RAS, wherein the target RAS determining comprises selecting the target RAS through MAC message exchange between the MS and the previous RAS, if the target RAS is selected, generating a target RAS select primitive and forwarding the target RAS select primitive to an IP layer, sending, by the MAC layer of the MS, a Handover Initiation MOB_HO-IND message to the previous RAS;

upon receipt of the MOB_HO-IND message, ending, by the previous RAS, service to the MS, upon receipt of the target RAS select primitive, sending, by the IP layer, a fast binding update FBU message to the upper node of an ACR connected to the previous RAS, and upon failure to receive a fast binding acknowledgement FBAck message, transitioning from a predictive mode to a reactive mode.

2. The method of claim 1, wherein the IP network information gathering comprises:

detecting, by the MAC layer of the MS, an identifier (ID) of a neighbor RAS through scanning;

generating a new RAS identification primitive including the ID of the neighbor RAS, and forwarding the new RAS identification primitive to an IP layer; and upon receipt of the new RAS identification primitive, gathering, by the IP layer, IP network information.

3. The method of claim 1, wherein the IP network information gathering comprises:

sending, by the IP layer, a Router Solicitation for Proxy (RtSoIPr) message to the upper node of the previous ACR;

receiving a Proxy Router Advertisement (PrRtAdv) message from the upper node of previous RAS in response to the RtSoIPr message; and detecting IP network information from the PrRtAdv message.

4. The method of claim 1, wherein the target RAS determining comprises:

selecting a target RAS through MAC message exchange between the MS and the previous RAS;

if the target RAS is selected, generating a target RAS select primitive and forwarding the target RAS select primitive to an IP layer;

upon receipt of the target RAS select primitive, sending, by the IP layer of the MS, a Fast Binding Update (FBU) message to the upper node of the previous ACR;

upon receipt of the FBU message, sending, by the upper node of the previous ACR, a Handover Initiation (HI) message to the selected upper node of an ACR connected to the target RAS;

upon receipt of a Handover Acknowledge (HAck) message in response to the HI message, sending, by the upper node of the previous ACR, a Fast Binding Acknowledgement (FBAck) message to the MS and the upper node of the ACR of the target RAS in response to the FBU message;

upon receipt of the FBAck message, generating, by the IP layer of the MS, a link switch primitive and forwarding the link switch primitive to a MAC layer;

upon receipt of the link switch primitive, forwarding, by the MAC layer of the MS, a Handover Indication (MOB_HO-IND) message for actual handover to the previous RAS; and upon receipt of the MOB_HO-IND message, ending, by the previous RAS, service to the MS.

5. The method of claim 1, wherein the tunneling comprises:

completing MAC layer handover by performing an IEEE 802.16 network entry procedure;

after the completion of the MAC layer handover, generating, by the MAC layer of the MS, a link activation (Link_Up) primitive and forwarding the Link_Up primitive to the IP layer to notify possibility of receiving data through a new link; and upon receipt of the Link_Up primitive, sending a Fast Neighbor Advertisement (FNA) message to the upper node of an ACR connected to the target RAS.

6. The method of claim 1, wherein the tunneling comprises:

completing MAC layer handover by performing an IEEE 802.16 network entry procedure;

after the completion of the MAC layer handover, generating, by the MAC layer of the MS, a Link_Up primitive and forwarding the Link_Up primitive to the IP layer to notify possibility of receiving data through a new link;

upon receipt of the Link_Up primitive, sending an FNA message to the upper node of an ACR connected to the target RAS; and upon receipt of the FNA message, testing, by the upper node of the ACR of the target RAS, uniqueness of a New Care-of-Address (NCoA).

7. The method of claim 6, wherein the FNA message comprises an FBU message.

8. The method of claim 6, wherein if the NCoA is unique, the upper node of the previous ACR and the upper node of the ACR connected to the target RAS generate a tunnel by exchanging the FBU message and the FBAck message with each other, and form a packet.

9. The method of claim 6, wherein if the NCoA is not unique, the upper node of the ACR connected to the target RAS receives from the upper node of previous ACR a Proxy Router Advertisement (PrRtAdv) message including a negative acknowledgement (NACK) message, and discards the FBU message.

10. The method of claim 1, wherein, when the MS enters predictive mode, the tunneling further comprises sending a handover request to the previous RAS and receiving a handover response from the previous RAS.

11. The method of claim 10, wherein the receiving of the handover response from the previous RAS comprises receiving the handover response to the link layer of the MS, and notifying the IP layer of the MS that the handover response has been received.

12. The method of claim 1, wherein, when the MS enters the reactive mode, the method further comprises sending a Fast Neighbor Advertisement (FNA) to a target ACR connected to the target RAS to indicate to the target ACR the identity of the previous ACR.

* * * * *